(12) United States Patent
Drummond et al.

(10) Patent No.: US 7,726,465 B2
(45) Date of Patent: Jun. 1, 2010

(54) METHOD AND APPARATUS FOR OPEN PIT BENCH MINING

(75) Inventors: Garry N. Drummond, Birmingham, AL (US); Eugene Honeycutt, Birmingham, AL (US); Harold Gene Anderson, Jasper, AL (US)

(73) Assignee: Drummond Company, Inc., Birmingham, AL (US)

( * ) Notice: Subject to any disclaimer, the term of this patent is extended or adjusted under 35 U.S.C. 154(b) by 134 days.

(21) Appl. No.: 11/575,273

(22) PCT Filed: Sep. 9, 2005

(86) PCT No.: PCT/US2005/032081

§ 371 (c)(1),
(2), (4) Date: Mar. 14, 2007

(87) PCT Pub. No.: WO2006/033849

PCT Pub. Date: Mar. 30, 2006

(65) Prior Publication Data

US 2008/0093911 A1  Apr. 24, 2008

Related U.S. Application Data

(60) Provisional application No. 60/610,081, filed on Sep. 15, 2004, provisional application No. 60/639,829, filed on Dec. 28, 2004.

(51) Int. Cl.
*B65G 45/10* (2006.01)
*B65G 15/44* (2006.01)
(52) U.S. Cl. .................... 198/494; 198/537; 198/698
(58) Field of Classification Search ............... 198/537, 198/494, 698–699.1
See application file for complete search history.

(56) References Cited

U.S. PATENT DOCUMENTS 285,788 A * 10/1883 Bidwell ............... 198/537
1,146,866 A * 7/1915 Grapher ............... 198/692

(Continued)

FOREIGN PATENT DOCUMENTS

DE  1 090 573  10/1960

OTHER PUBLICATIONS

European Search Report from counterpart European Patent Nov. 28, 2008 from Counterpart Appln. No. 05796495.9.

(Continued)

*Primary Examiner*—Mark A Deuble
(74) *Attorney, Agent, or Firm*—Volpe and Koenig P.C.

(57) ABSTRACT

A bench mining system and mining method, particularly useful for open pit bench mining, employs a combination of bulldozers and transversely movable apron feeders to provide the primary mechanism for removal of overburden. The apron feeders are preferably equipped with a self-cleaning arrangement to facilitate continuous operation without undue stoppages.

8 Claims, 33 Drawing Sheets

U.S. PATENT DOCUMENTS

| | | | | |
|---|---|---|---|---|
| 1,205,309 | A | * 11/1916 | Wright | 164/329 |
| 1,513,744 | A | * 11/1924 | Clements | 198/537 |
| 1,808,237 | A | * 6/1931 | Liggett | 198/494 |
| 2,191,322 | A | 6/1937 | Matthews | |
| 2,340,783 | A | * 2/1944 | Wegner | 198/529 |
| 2,560,140 | A | * 7/1951 | Thayer | 171/63 |
| 2,619,218 | A | * 11/1952 | Krehbiel et al. | 198/530 |
| 3,407,918 | A | * 10/1968 | Clarke | 19/105 |
| 3,549,003 | A | * 12/1970 | Jacobson | 198/709 |
| 3,595,379 | A | * 7/1971 | Campbell | 198/699.1 |
| 4,150,853 | A | 4/1979 | McCoy | |
| 4,402,392 | A | 9/1983 | Fabian et al. | |
| 4,491,279 | A | 1/1985 | Long et al. | |
| 5,427,439 | A | 6/1995 | Herickhoff | |
| 5,553,968 | A | * 9/1996 | Campbell | 404/108 |
| 6,422,374 | B1 | 7/2002 | West | |
| 7,055,674 | B2 | * 6/2006 | Magaldi | 198/494 |

OTHER PUBLICATIONS

Supplementary European Report Search Report dated Nov. 19, 2008 from Counterpart European Appln. No. EP 0579 6495.9.

* cited by examiner

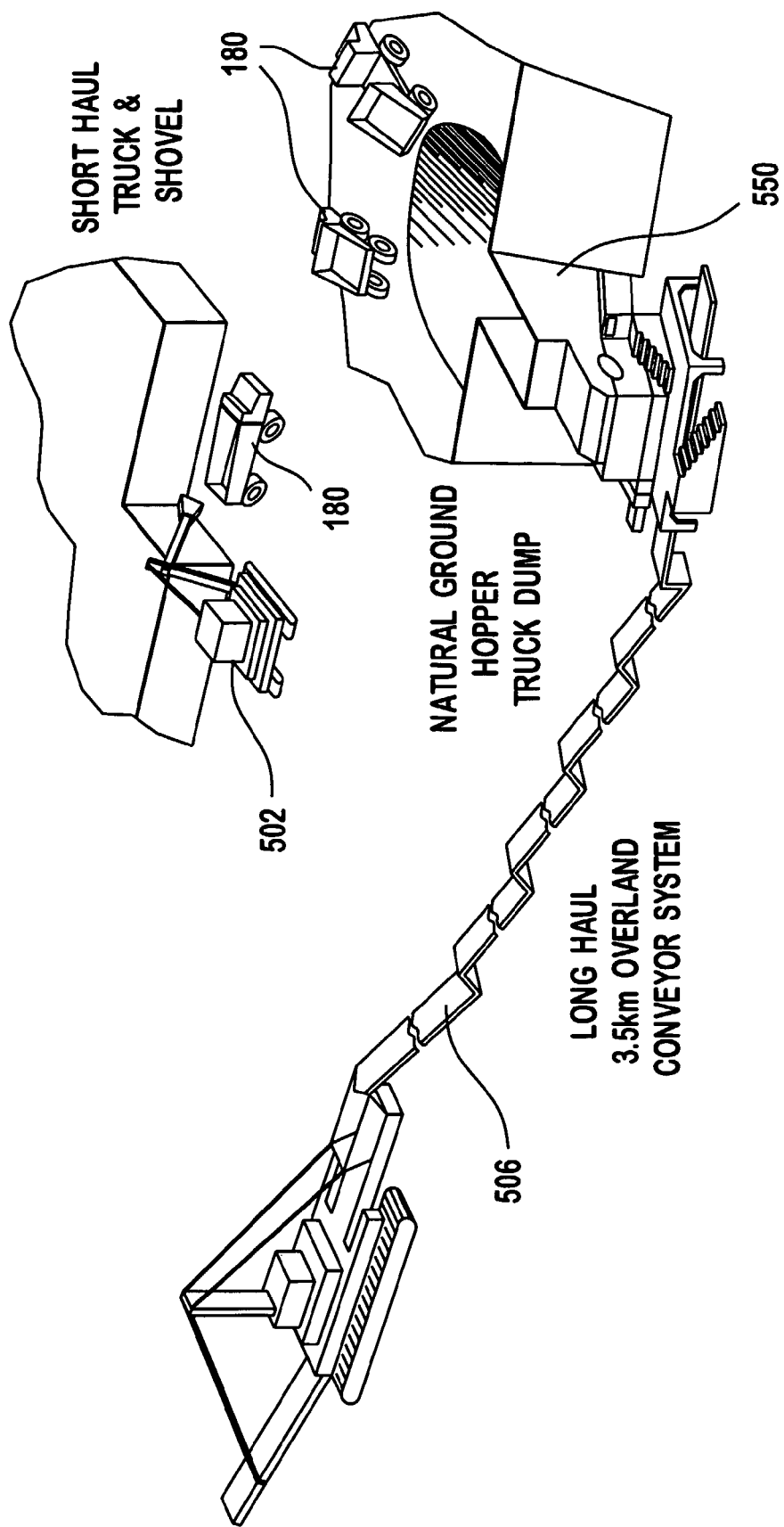

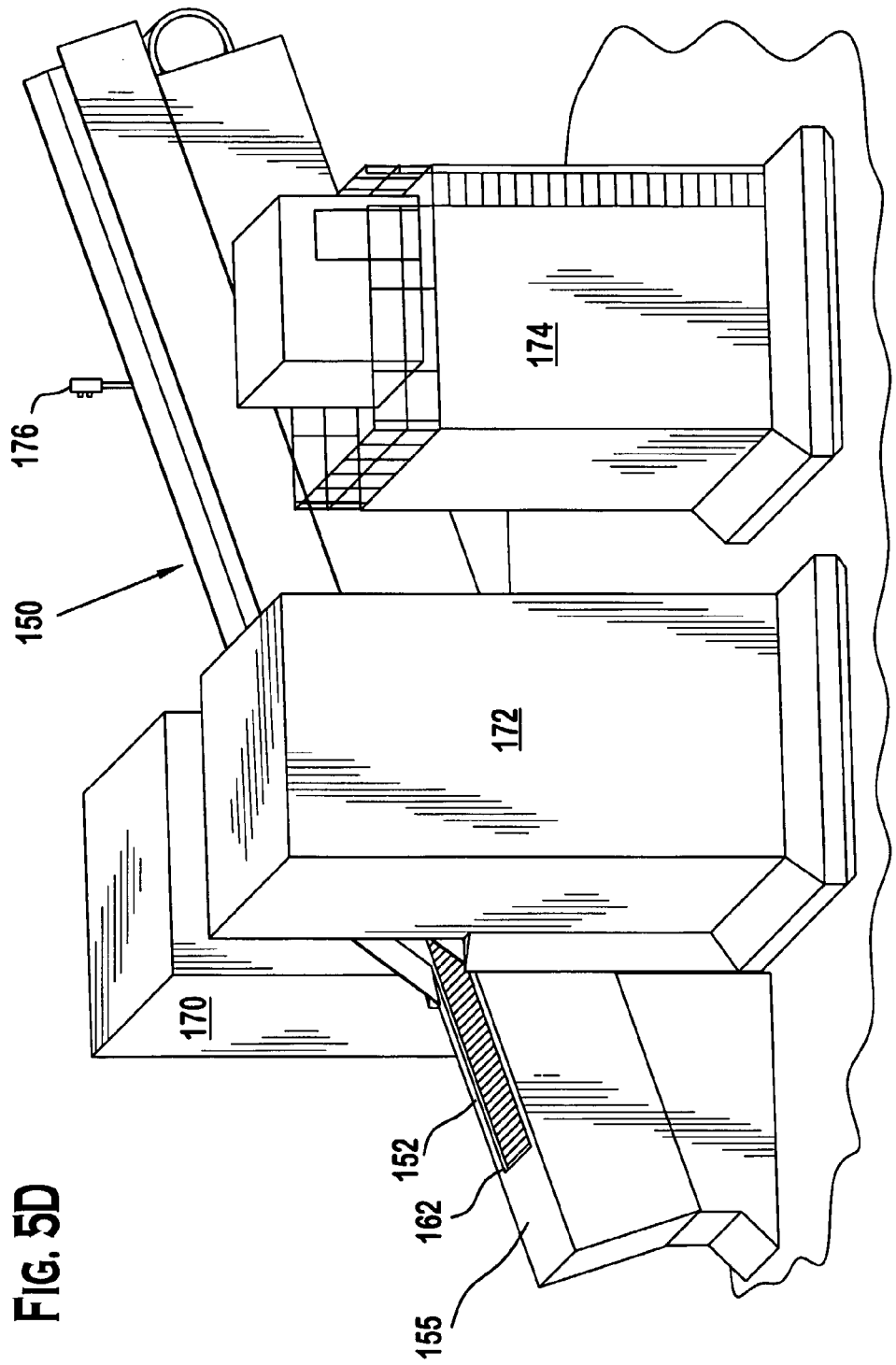

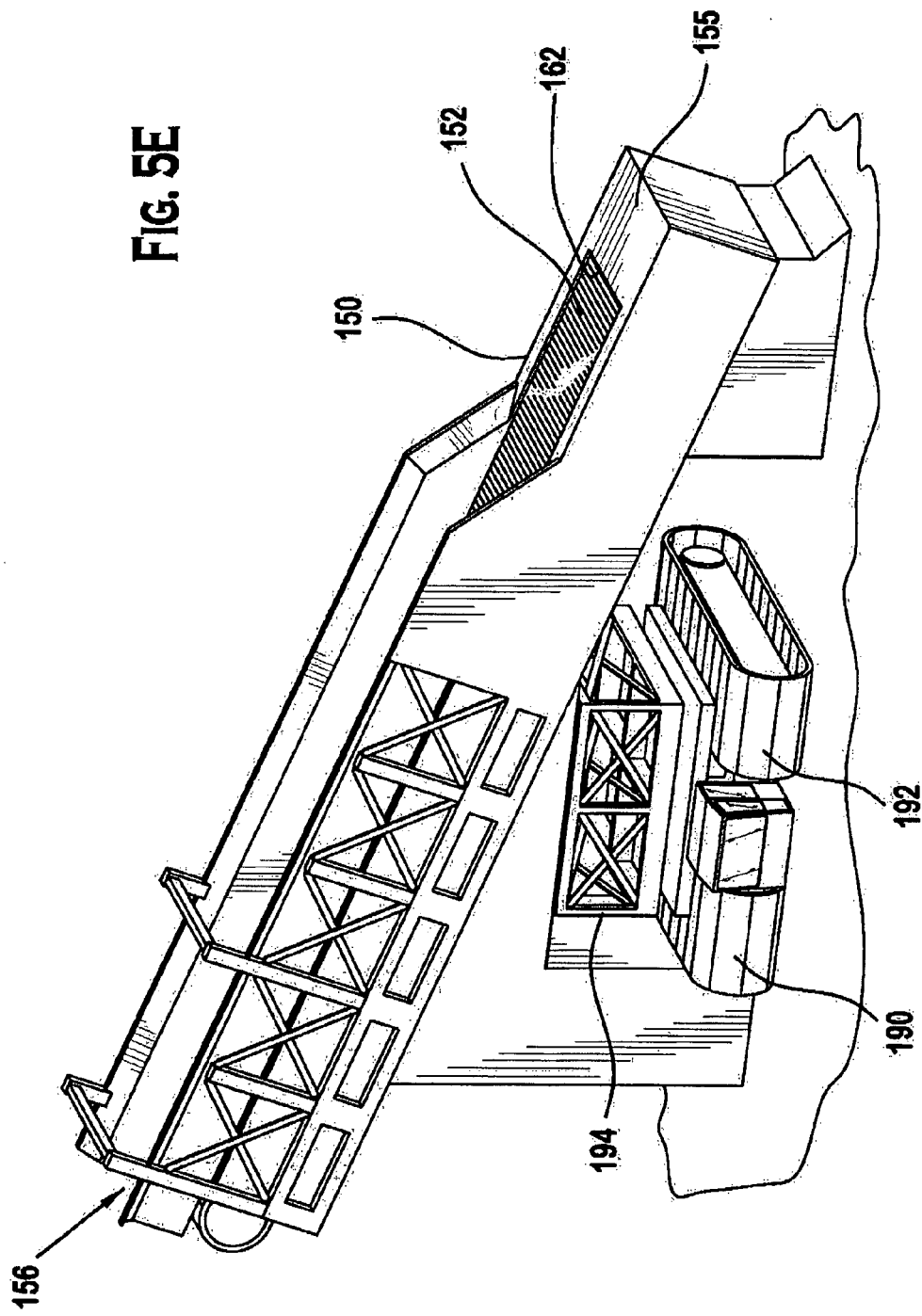

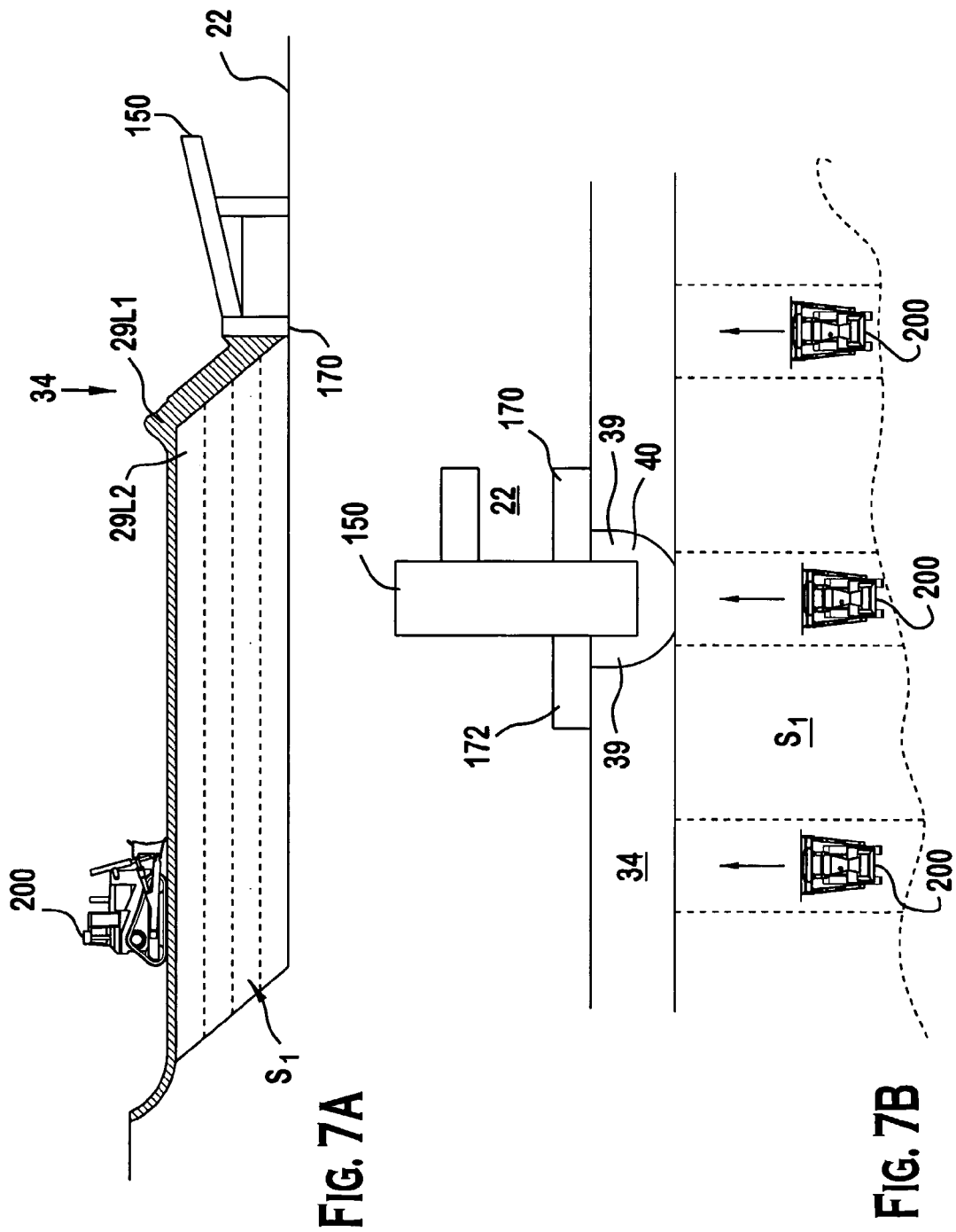

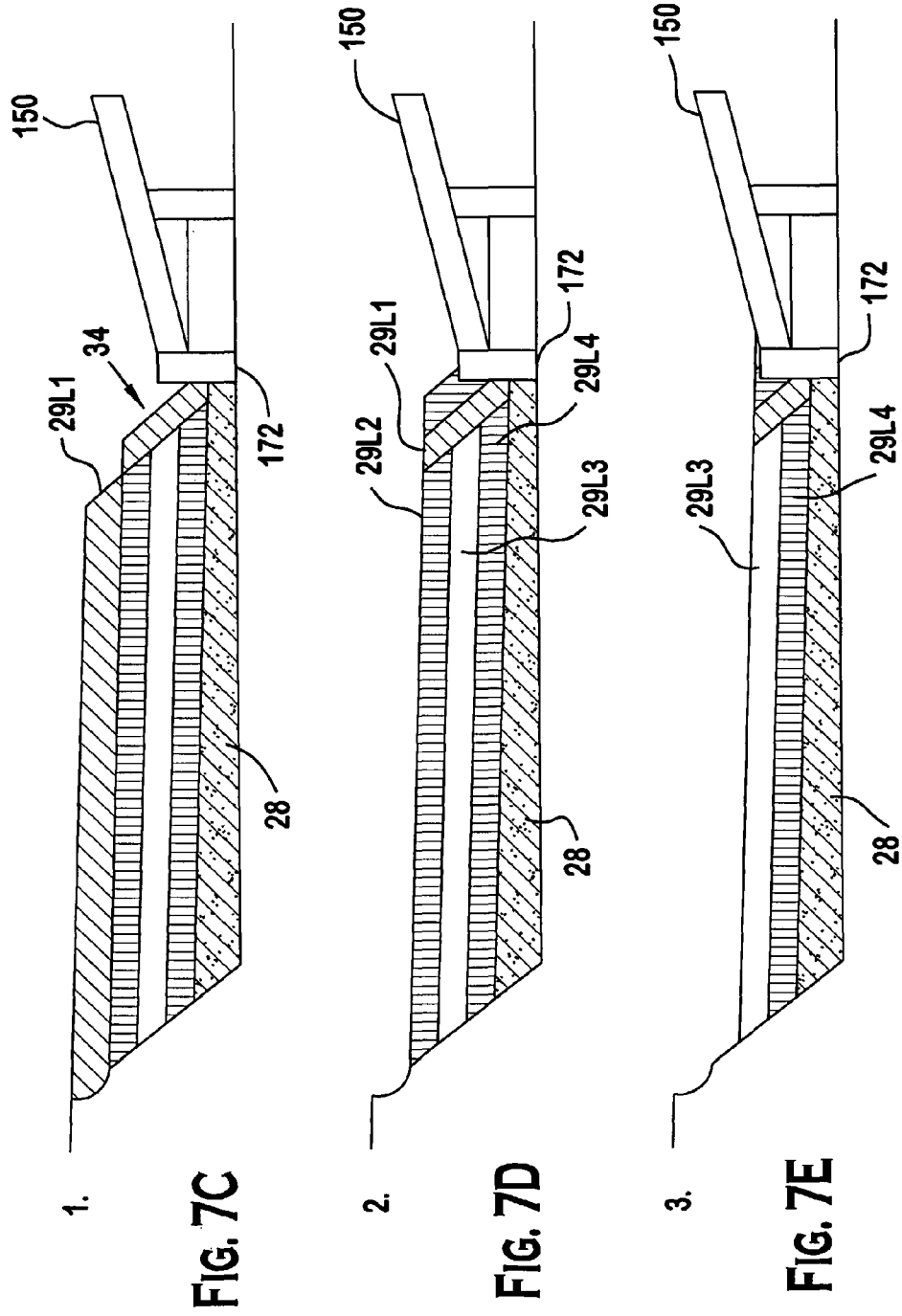

METHOD AND APPARATUS FOR OPEN PIT BENCH MINING

FIELD OF INVENTION

This invention relates to methods and apparatus for mining and in particular for open pit bench mining and apron feeders used in connection therewith.

BACKGROUND

In modern mining, geologic surveys and other techniques estimate the size and shape of mineral and/or ore configurations before their removal in a mining operation. The ore and mineral deposits exist in layers or veins at varying depths below ground. For example, deposits of coal can be divided into multiple layers of substantially horizontal planes of varying thickness and at various depths such that several deposits or veins lie at different levels spanning hundreds of feet below ground. Such layers of mineral and ore deposits are often not completely horizontal but have a pitch or slope. Because of the three dimensional sloping layers, the deposits are generally mined from the shallowest end of the deposit in a down slope direction.

In general the rock and earth disposed on top of a mineral or ore layer is referred to as "overburden". In open pit mining, the overburden atop a first uppermost layer is removed to substantially expose a strip of the mineral or ore deposit. The exposed deposit is then accessible to be removed by mining the uncovered portion and transporting it from the mine for shipment or other processing. Overburden is then removed from above a next adjacent strip of the first layer deposit to substantially expose more of the first deposit layer for removal by mining and shipment.

In open pit mining, once a portion of the uppermost deposit layer is mined and removed, the rock that had been sandwiched between the uppermost layer and the and the next lower deposit layer is exposed and is the overburden atop the next lower layer. Accordingly, the open pit process mining continues by removing strips of that overburden to generally expose the next deposit layer, in a sequential process that continues until successive deposit layers are exhausted. Depending on the size of the deposit, each strip may be several miles in length and is typically about 100 or more feet in width depending on the type of equipment used for the mining operation and other factors such as the size and pitch of the deposit layer.

As open pit mining continues, overburden removal above each deposit layer forms steps or benches. At each step, multiple removal operations increase efficiency in mining the ore or other minerals within the deposits. Multiple operations, however, take some time, and can be cost prohibitive if projected mining yields are not sufficiently high.

The valuable deposit layers are generally much smaller than the layers of overburden. Thus, the most labor intensive task in open pit mining is the removal of the overburden.

In one conventional mining method, a bucket wheel excavator 500, as illustrated in FIG. 1A, loads overburden 29 onto dump trucks 180. A single bucket wheel excavator 500 may cost on the order of One-Hundred Million Dollars ($100,000,000) and require a trained crew of 6 to 8 persons to operate.

As an alternative to a bucket wheel excavator, shovels, drag lines or other bucket type equipment are often used to remove overburden. For example, FIG. 1B illustrates a conventional operation where a shovel 502 loads large oversized dump trucks 180 which deposit their materials into a hopper on a centrally located apron feeder 550. The apron feeder 550 may feed a sizer that reduces oversized chunks of overburden to a size manageable by a conveyor 506 or other means of transport that carries the removed overburden away from the active mining area.

In a conventional mining operation, the apron feeders 550 is typically located at a semi-permanent position where overburden is trucked and deposited to a feed end of the apron feeder. When initially positioned or relocated, an apron feeder 550 is traditionally moved in a direction aligned with the feeder's conveyor operation so that they are essentially backed into a desired location. It is known in the art to provide apron feeders 552 with wheels or crawler undercarriage in line with the feeder operation for the purpose of positioning the apron feeders 552 such as illustrated in FIGS. 2A and 2B.

Applicants have recognized that it would be desirable to provide a method and system of open pit mining that reduces or eliminates the need for reliance on complicated and expensive equipment such as bucket wheel excavators and efficiently uses the necessary equipment. Applicants have in particular recognized that more efficient mining can be conducted through the creative expanded use of apron feeders in the mining operation.

Further, applicants have recognized that improved apron feeder designs may be employed to prevent costly operational stoppages due to the need for cleaning clogged material from an apron feeder.

SUMMARY

A bench mining system, mining method and related equipment are provided in which a combination of bulldozers and transversely movable apron feeders provide a primary mechanism for overburden removal. The mobility of teams of dozers along with the apron feeder, as described herein, is a significantly new and effective innovation in overburden removal. With an eye towards being able to move the entire mining operation, not only are the earth-moving pieces of equipment considered movable, but so is the entire infrastructure supporting the earth-moving equipment, including pump-houses, retaining walls, and the like.

In a preferred embodiment, a mining floor or "bench" is defined adjacent to a section of a deposit layer and overburden. Preferably, the overburden and deposit layer have a combined height relative to the bench of between 50 to 150 feet. An apron feeder is disposed on the bench in front of a pre-blasted section of overburden which preferably runs about 300 feet along the bench and the apron feeder is preferably positioned in the approximate center of the 300 feet long section. Selective blasting, as is well known in the art, is used to loosen the overburden rock and/or other material of which it is composed while leaving the deposit layer substantially intact. Preferably, the loosened section of overburden in front of which the apron feeder is positioned is about 225 feet wide, extending away from the apron feeder.

The invention further comprises bulldozers working in coordinated teams that push the overburden of the pre-blasted section onto the feed end of the apron feeder by preferably forming a natural hopper and relying on gravity to create a flow of the loosened overburden into the apron feeder. The bulldozers preferably work in defined zones and coordinate their efforts depending on the number of bulldozers employed. The apron feeder is then used to either load the bulldozed overburden onto trucks or onto a conveyor system for removal from the active mining area. After overburden removal, the substantially uncovered portion of the deposit layer is then mined using conventional methods.

The operation preferably continues along the bench by blasting further sections of overburden and transversely relocating the apron feeder in front of the next loosened section whereat further bulldozing pushes the loosened overburden into the apron feeder, which in turn, feeds the trucks or the conveyor system.

Where the layer deposits are in closely spaced intervals of less than 50 feet, a bench can be defined adjacent a section having an intermediate deposit layer within the overburden. In such case, selected blasting techniques known in the art are employed to blast the overburden atop the intermediate deposit layer as well as below the intermediate deposit layer. Then the bulldozing operation first removes the upper portion of overburden above the intermediate deposit layer and the intermediate deposit layer is mined and removed. Thereafter, the bulldozers are used to remove the lower portion of the overburden. The apron feeder can be either transversely displaced to a location for receiving another section of upper loosened overburden while the intermediate deposit layer is mined from the first section or remain at the same location for both upper and lower overburden removal operations.

Where the layer deposits are spaced at an interval of more than 150 feet, a bench can be defined where there is no deposit layer of mineral or ore within the overburden. In such case, after blasting and removal of the loosened overburden by dozing it into the apron feeder, no mining operation is required on that bench.

The blasting, dozer/apron feeder overburden removal, and deposit mining operations are preferably contemporaneously conducted on several benches where each operation is selectively transversely spaced from each other by a selected safety margin.

In order to implement the system and operation thereof, the inventive apron feeders are preferably provided with a frame that permits engagement with a crawler for displacement of the apron feeder in a direction that is transverse to a conveying direction of the apron feeder. Alternatively, the apron feeder is provided with an innovative dedicated crawler affixed thereto or other means of transverse locomotion to facilitate efficient operations as the removal of overburden proceeds along one of the benches.

Preferably, apron feeders used to conduct the inventive mining operation are provided with a self-cleaning mechanism to facilitate continuous operation without undue stoppage delays. In particular, the apron feeder is preferably provided with a scroll plate at its inlet end to catch overspill material as the apron feeder is loaded. Preferably, a "grizzly" component is mounted on an apron feeder flight that serves to break up and/or loosen material caught by the scroll plate and a wiper component is disposed on an apron feeder flight a selected distance behind the grizzly to clear the material from the scroll by pushing it back to the top of the apron feeder inlet end.

Other objects and advantages of the present invention will be apparent from the following detailed description and the accompanying drawings.

BRIEF DESCRIPTION OF THE DRAWING(S)

FIG. 1B is a schematic illustration of a conventional open pit mining operation where a shovel loads short haul dump trucks that transport the shoveled material to a relatively stationary fixed position apron feeder in a conventional open pit mining operation.

FIG. 5D is an illustration of an apron feeder with extension walls.

FIG. 5E is an illustration of an alternate embodiment of the transport tractor and apron feeder.

FIGS. 7A and 7B are side and top views of an initial push to an apron feeder.

FIGS. 7C-E show three successive cuts of overburden.

Figure 8:
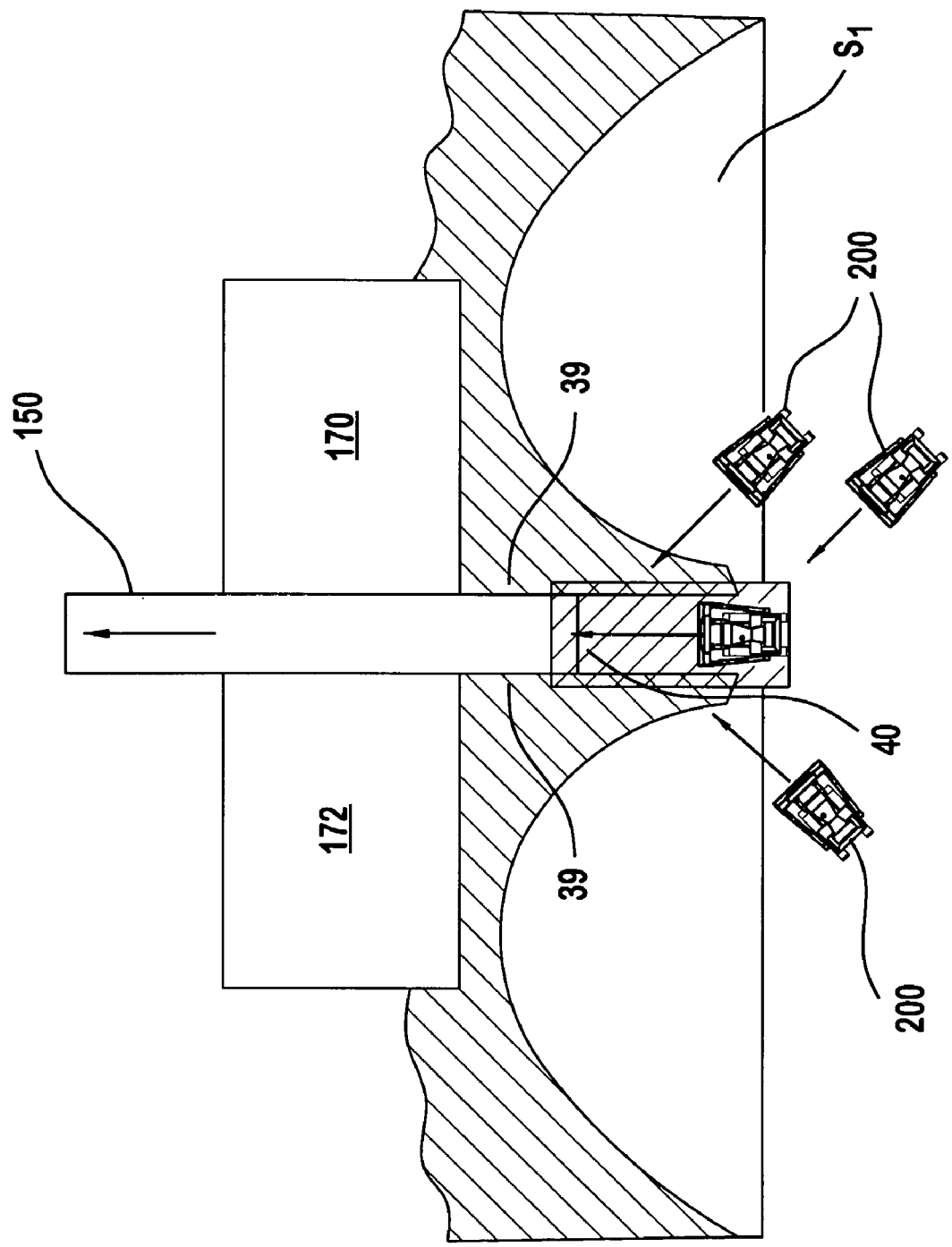

FIG. 8 illustrates a top view of a successive dozer push towards an apron feeder.

Figure 9:
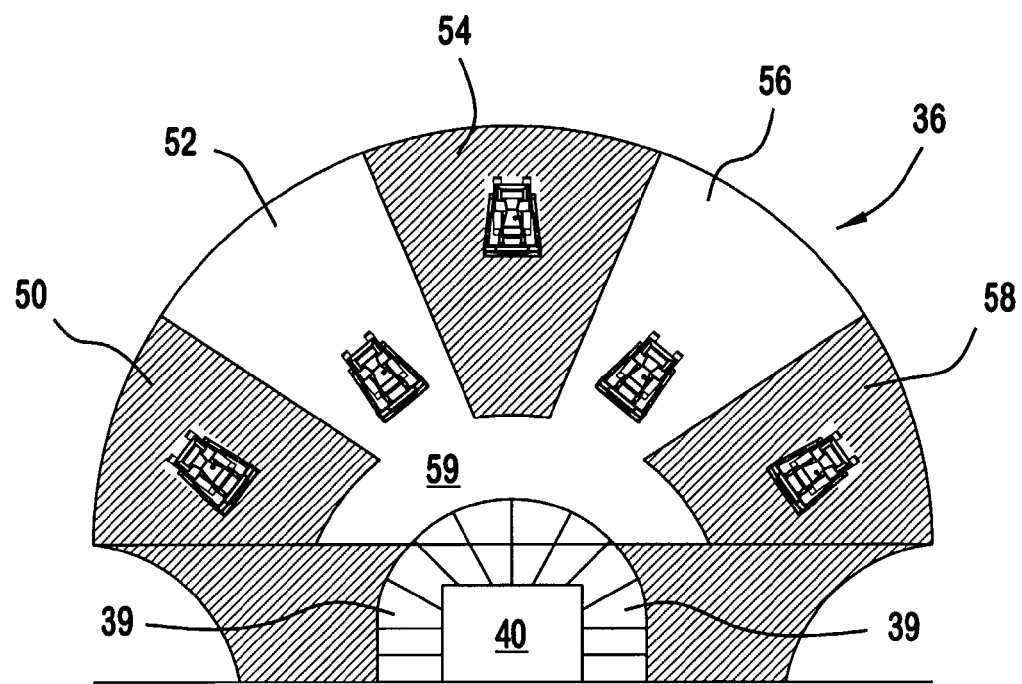

FIG. 9 illustrates a top view of a first embodiment of a method of loading the apron feeder.

Figure 10:
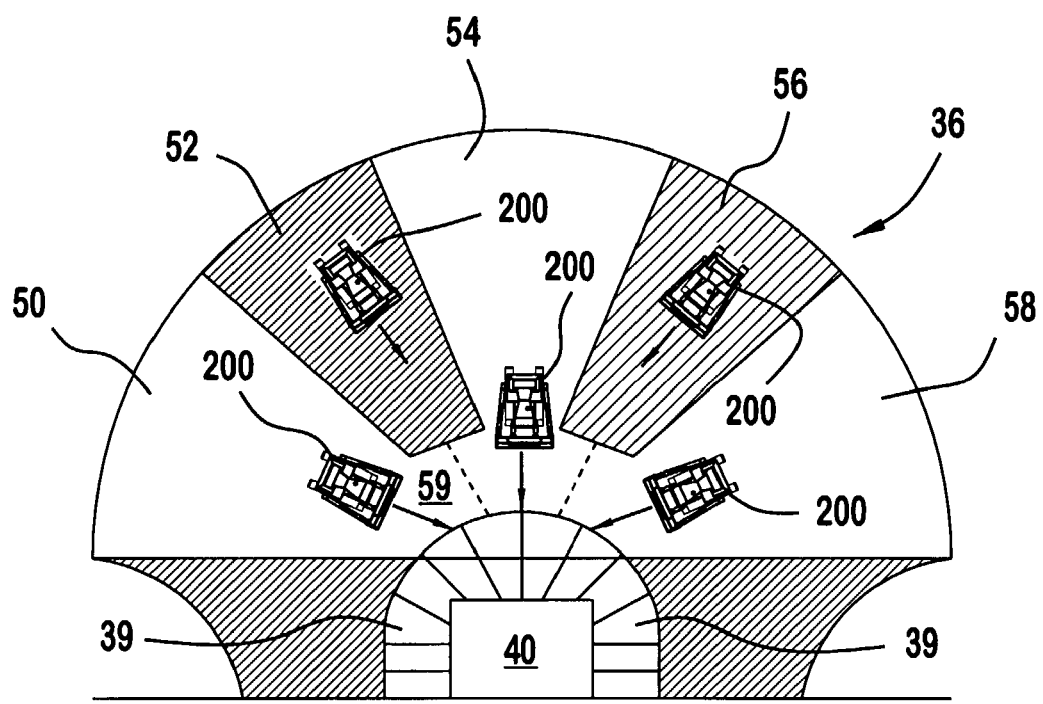

FIG. 10 illustrates a top view of a second embodiment of a method of loading an apron feeder.

Figure 11:
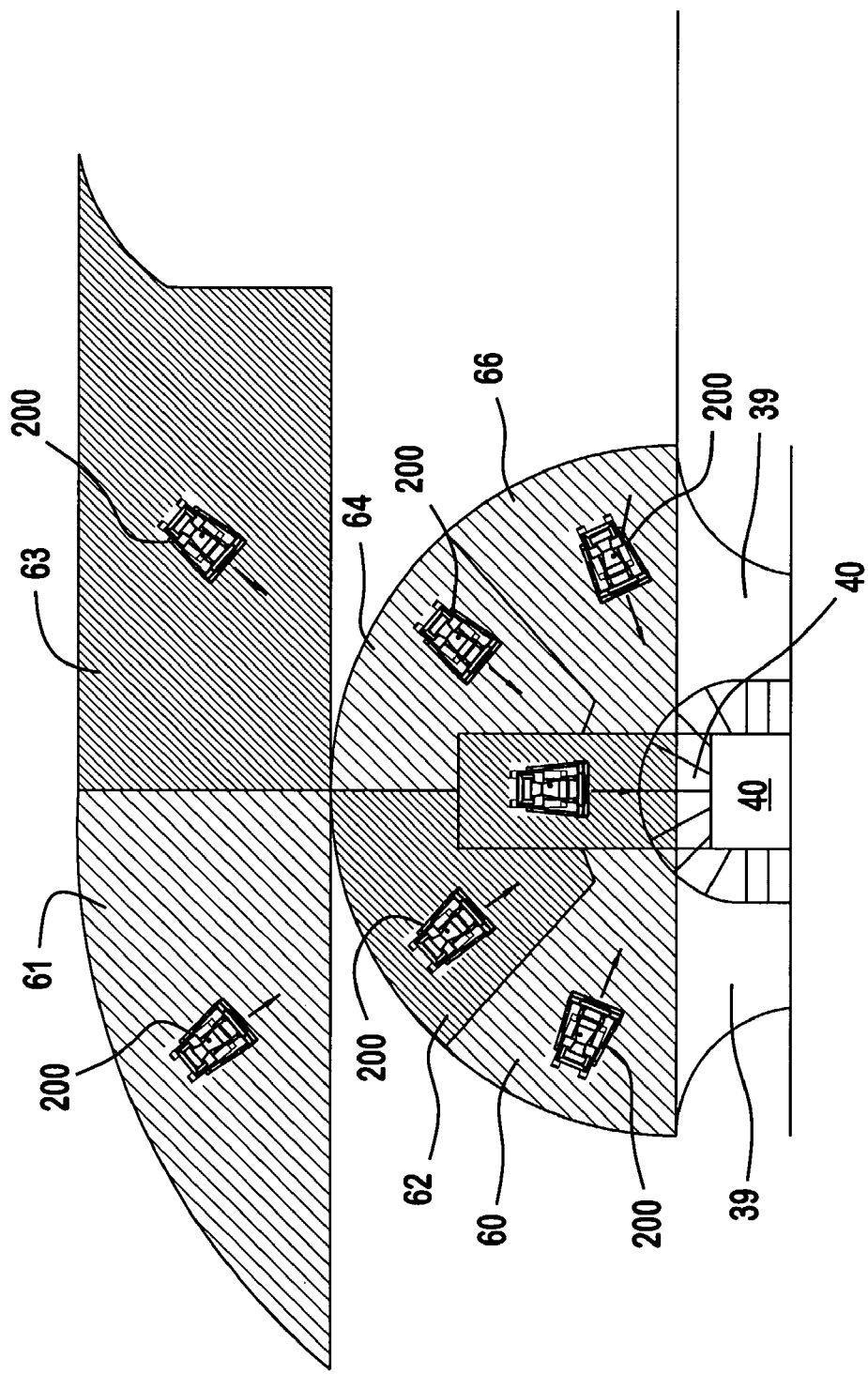

FIG. 11 illustrates a top view of a third alternate embodiment of a method of loading an apron feeder.

FIGS. 12A-H illustrate iterative steps in a top view of a fourth method for loading a movable apron feeder.

FIGS. 13A-H illustrate iterative steps in a top view of a fifth method for loading a movable apron feeder.

FIG. 14A-I illustrate iterative steps in moving an apron feeder used in the invention.

DETAILED DESCRIPTION OF PREFERRED EMBODIMENTS

Overview of Operation and Equipment

Figure 3A:
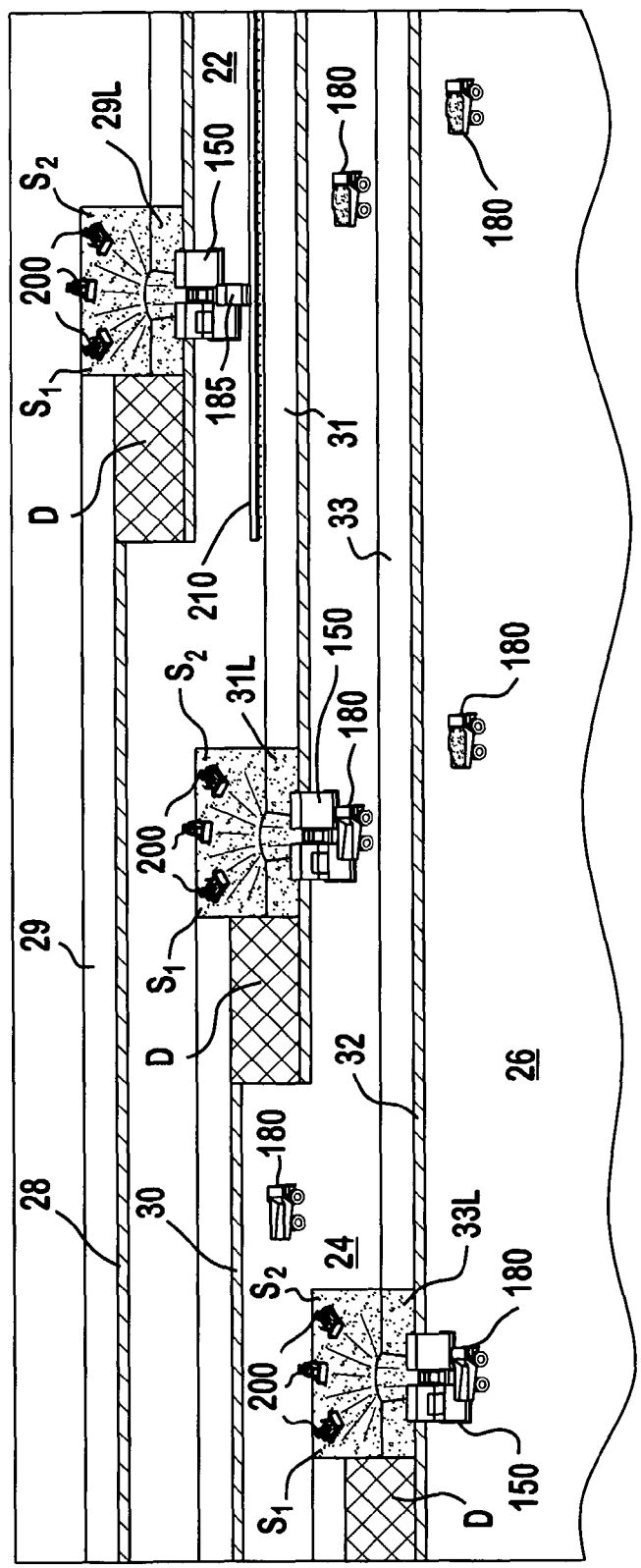
FIG. 3A is an overall perspective view of an open pit bench mining system in accordance with the teachings of the present invention.

FIG. 3A illustrates an open pit mining operation 20 wherein three benches 22, 24, 26 are at different levels relative to deposit layers 28, 30, 32 respectively. A layer of overburden 29, 31, 33, which a removal operation carries away, covers each level of deposit layer 28, 30, 32. Once the mineral or ore deposit is exposed, a mining operation removes the deposit layer 28, 30, 32 for further processing.

Preferably, the benches 22, 24, 26 are defined such that the height H of the deposit 28, 30, 32 and overburden 29, 31, 33 to which they are adjacent is between 50 and 150 feet. Each bench itself, preferably has a width of at least 100 feet extending from the deposit and overburden to which it is adjacent.

On each bench, an apron feeder is disposed in front of a pre-blasted section $S_1$ of loosened overburden 29L, 31L, 33L which preferably has a length L which runs about 300 feet along the bench. The apron feeder is preferably positioned at the approximate center of the 300 feet long section $S_1$. Preferably, the loosened section $S_1$ of overburden in front of which the apron feeder is positioned has a width W of about 225, extending away from the apron feeder. With the apron feeder 150 in place, bulldozers 200 push the loosened overburden 29L, 31L, 33L of the section $S_1$ into the feed end 152 of the apron feeder 150 using one of the methods shown in FIGS. 7-13, and discussed in more detail below.

The apron feeder 150 conveys the loosened overburden 31L, 33L onto trucks 180 for removal from the active mining area. Alternatively, loosened overburden 29L is fed into a sizer 185 for removal on a conveyor system 210. After removal of the overburden 29L, 31L, 33L, a substantially uncovered section D of the deposit layer 28, 30, 32 is then mined using conventional methods. As a practical matter, trucks are preferred for the deeper benches, but this is dependent on the type and availability of conveying equipment to serve as an alternative means.

Selective blasting to loosen the overburden 29, 31, 33 is performed using techniques well known in the art to loosen the rock and other overburden material while leaving the deposit 28, 30, 32 intact. A second section $S_2$ of overburden may be loosened by blasting before the apron feeder/dozer overburden removal operation is conducted. In practice, both safety considerations and operational efficiency are preferably used to determine when and whether multiple sections of overburden are to be blasted to loosen the overburden for the overburden removal operation.

In accordance with conventional practice, the exposed sections D resulting from the dozer/apron feeder overburden removal operation will include a relatively small overlying buffer layer of rock material so that the mineral or ore deposit itself is not contaminated by the blasting process. That relatively thin buffer layer is removed using conventional methods and the mineral or ore is removed by mining in a relatively pure form and is transported out of the open pit mine for further processing and/or shipment.

Preferably on each bench 22, 24, 26, the operations continue laterally along each bench and can be conducted contemporaneously at spaced locations on each bench. In general, the blasting overburden operation precedes the dozer/apron feeder overburden removal operation which in turn precedes the mining of the mineral or ore deposit. Each of the upper benches, such as benches 24 and 26, are in fact defined by overburden for a lower bench. Accordingly, the blasting of sections of overburden 29 is performed after that area has already completed its service in forming a base for removal operations of the higher overburden and mining of the upper deposits.

As illustrated in FIG. 3A, contemporaneous operation of the three procedures, blasting, overburden removal and mining, can be laterally spaced along each bench with the active areas respectively being laterally spaced to produce a very efficient mining operation with relatively inexpensive equipment.

Variations Due to Spacing of Mineral or Ore Deposits

As noted above, the benches are preferably defined such that the adjacent overburden and deposit combination is in a range from 50 to 150 feet in height H. Where the layer deposits are spaced in close interval of less than 50 feet, a bench can be defined where there is an intermediate deposit layer within the overburden.

In such case, selected blasting techniques known in the art are employed to blast the overburden 31 atop the intermediate layer 30i as well as below the intermediate deposit layer. Preferably, a bulldozing operation first removes the upper overburden above the intermediate deposit layer, the intermediate deposit layer is mined and removed, and then bulldozers are used to remove the lower portion of the overburden. The apron feeder may be transversely displaced to a location for receiving another section of upper loosened overburden and then transversely returned. Alternatively, the apron feeder may remain at the same location during removal of the intermediate deposit for both overburden removal operations.

Figure 3B:
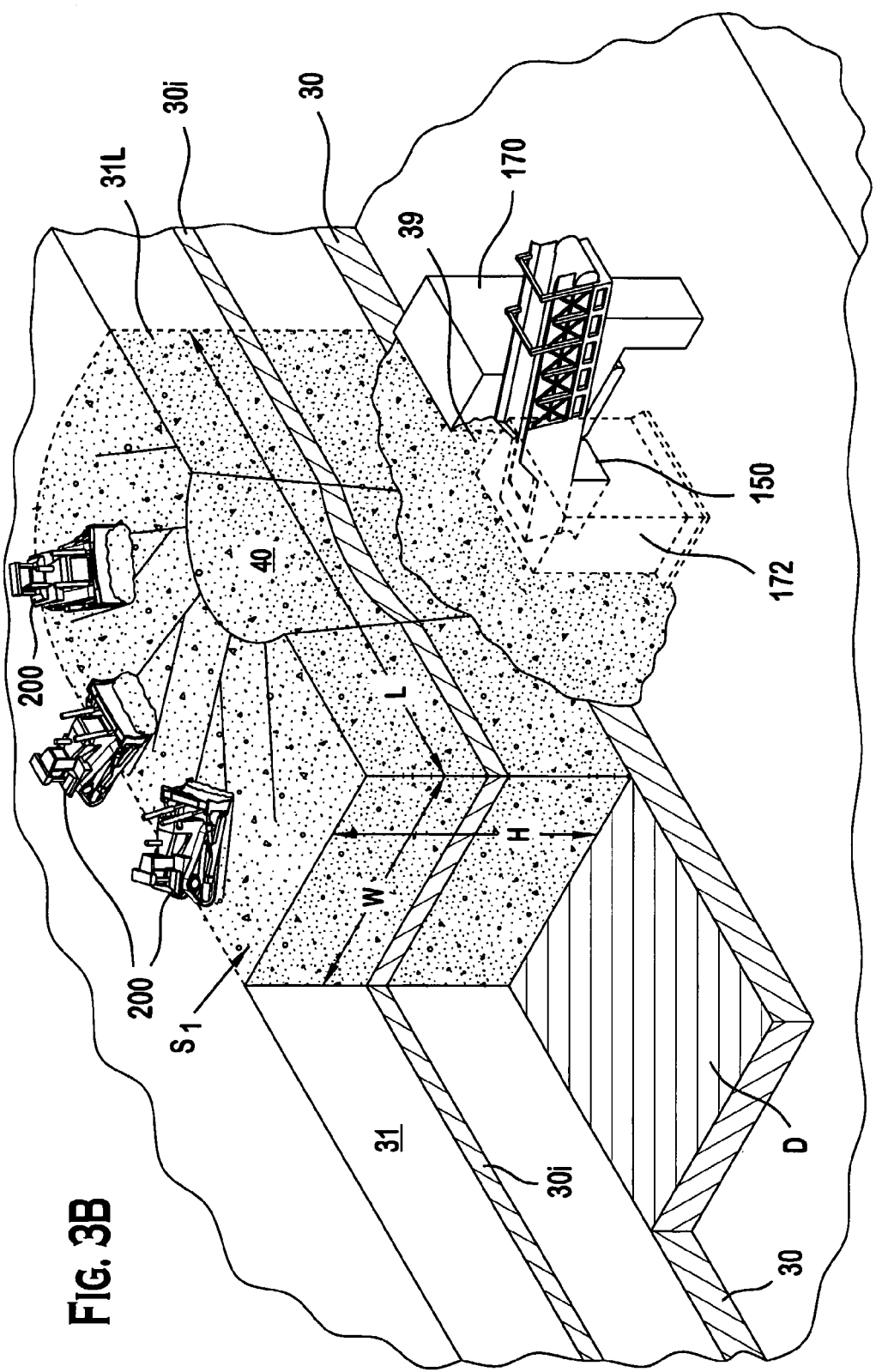
FIG. 3B is a perspective schematic diagram of the mining system of FIG. 3A wherein a bench is adjacent to a formation that includes multiple deposit layers.

For example, FIG. 3B illustrates an intermediate deposit layer 30i within the overburden 31 adjacent to bench 24. The intermediate deposit layer 30i could, for example, be five feet thick having a forty feet of overburden all of which is disposed above the lower deposit layer 30 that is ten feet thick having forty feet of overburden sandwiched between the deposits 30i, 30. In such an example, the bench 24 is defined at the level of the lower layer deposit 30 at a depth of ninety-five feet below the top of the overburden of the intermediate deposit 30i. After blasting to loosen both portions of the overburden 31L in section $S_1$, bulldozers are then used to first push the upper forty feet of overburden onto the apron feeder 150 stationed therebelow and the five foot thick intermediate deposit 30i is then removed. Bulldozers then remove the remaining forty feet of overburden lying atop the lower layer deposit 30 which permits the mining of the lower deposit material.

After the overburden atop intermediate deposit 30i is removed through the dozing operation, the apron feeder is preferably transversely moved along the bench where a next section $S_2$ of blasted overburden is removed through a bulldozing operation while the deposit is removed from the first five foot thick upper deposit layer 30i. Thereafter, the bulldozers and apron feeder can be returned to the first site $S_1$ to remove the lower forty feet of overburden 31L disposed on the lower deposit layer 30.

The return of the apron feeder to finish overburden removal may be after several sections of overburden atop intermediate deposit 30i are removed. Alternatively, a second set of dozers and a second apron feeder may be used on the same bench 24 to follow the removal of the intermediate deposit 30i. The second set of dozers and second apron feeder would then remove the lower forty feet of overburden to permits a second mining operation to proceed with respect to removing the lower deposit layer 30, preferably using a second set of deposit removal equipment. In either case, the transverse mobility of the apron feeders greatly facilitates the efficiency of the operation.

Where the layer deposits are spaced at an interval of more than 150 feet, a bench can be defined where there is no deposit layer of mineral ore within the overburden. In such case, after blasting and removal of the loosened overburden by dozing it into the apron feeder, no mining operation is required on that bench.

The movement of the bulldozers and apron feeders along the benches allows for efficient removal of both overburden and mineral deposits simultaneously, without extended equipment down time.

Apron Feeder Equipment

As best seen in FIGS. 4, 5A-5E, and 6A-6C, a preferred apron feeder assembly 150 is shown which is designed specifically for efficient implementation of mining operations in accordance with invention by facilitating transverse apron feeder movement. The apron feeder assembly includes a feed end 152, which receives material (overburden) that is conveyed to an outlet end 156 thus defining a conveying direction of the feeder. The apron feeder 150 is preferably comprised of 180 flights 146, each ten inches wide, which are horizontally pivotally connected in a continuous loop. This loop defines a conveyor with a top surface 146a that transports material from the feed end 152 to the outlet end 156 of the apron feeder 150, and a bottom surface 146b. The inlet end 152 of the apron feeder is conventionally enclosed within a strong metal box 155 called a "dog house" to protect it from impact and from compacted surrounding material during operation.

Figure 1A:
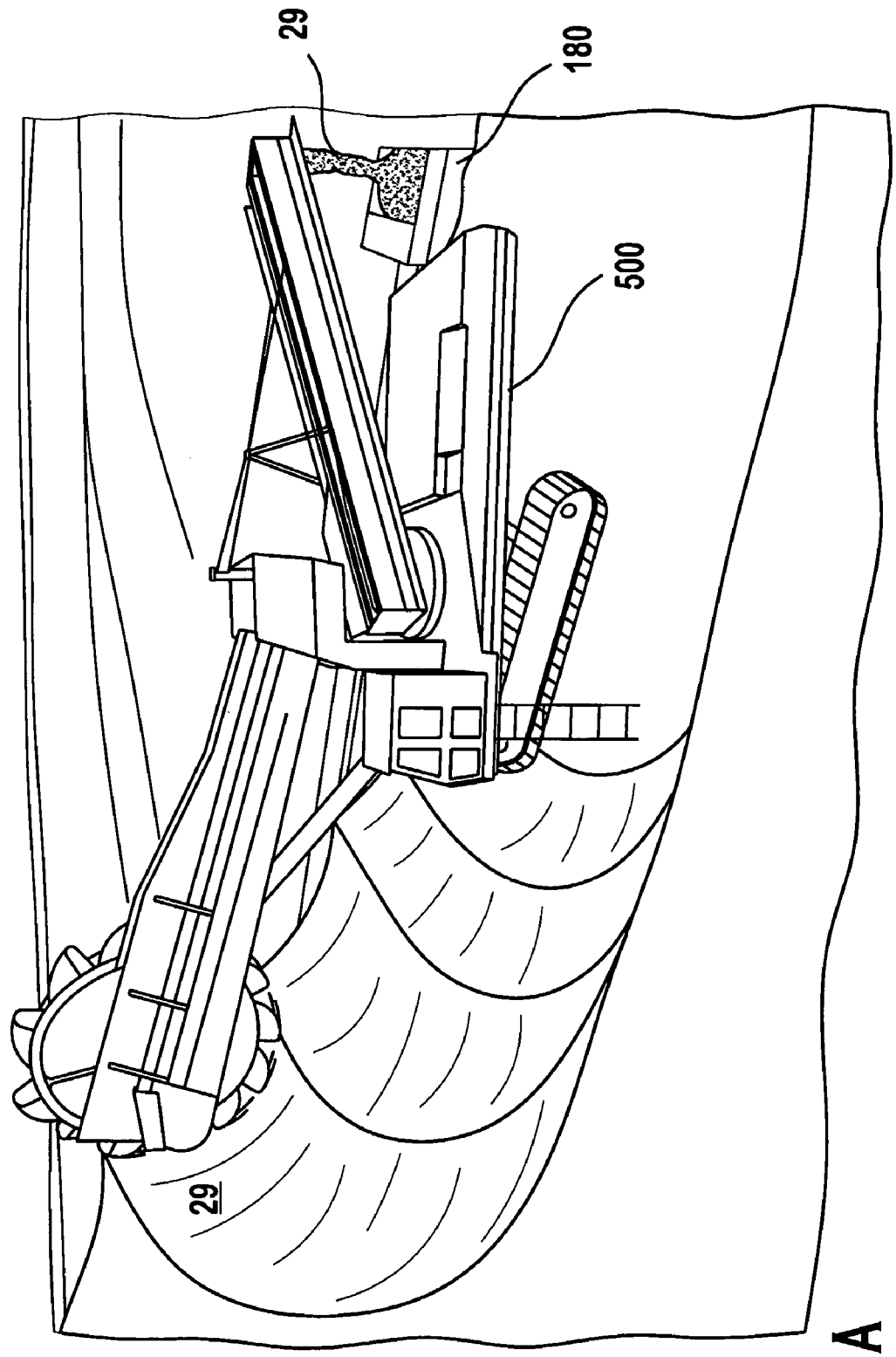
FIG. 1A is a perspective illustration of a prior art bucket wheel excavator used in conventional open pit mining.
Figure 4:
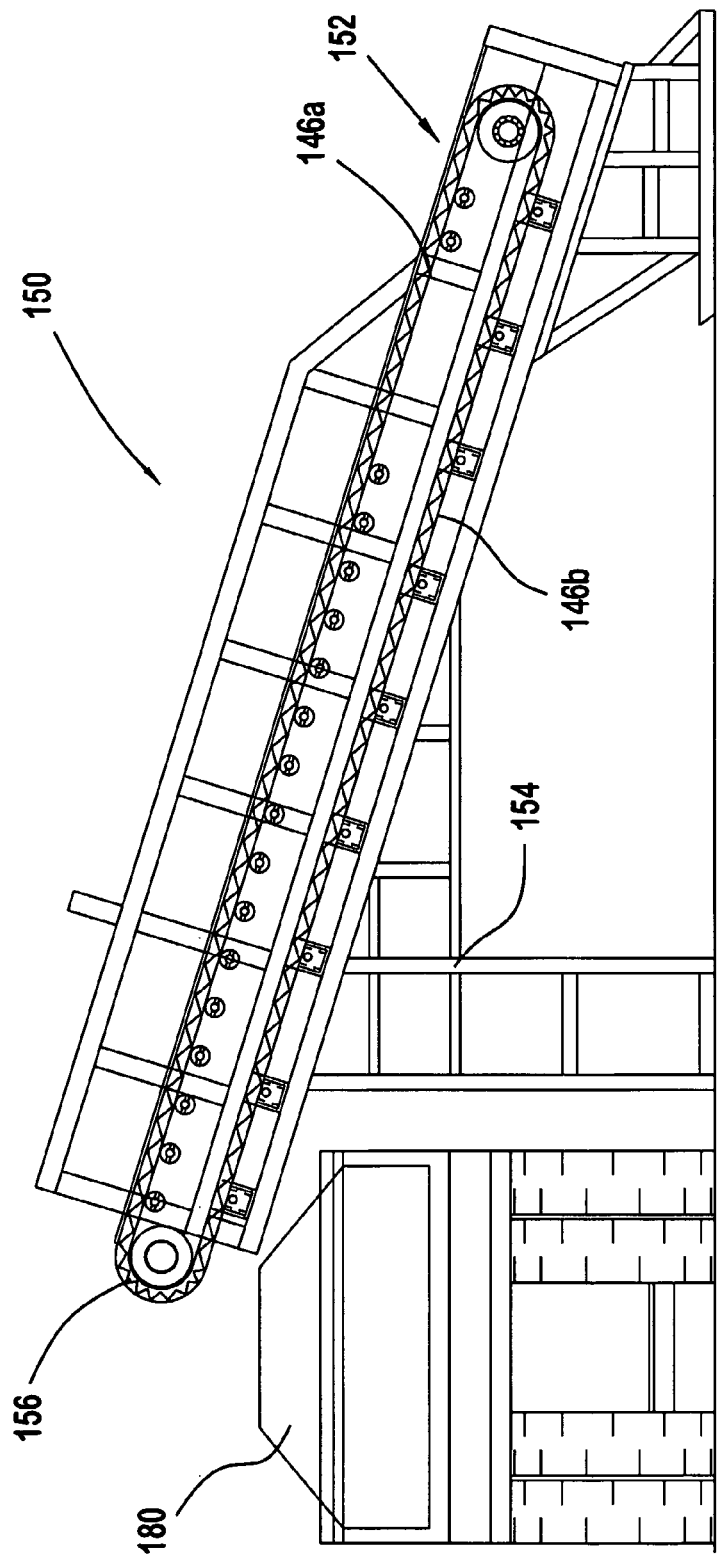
FIG. 4 is an elevated side view of an apron feeder configured for use in the mining operation depicted in FIGS. 3A and 3B.
Figure 5A:
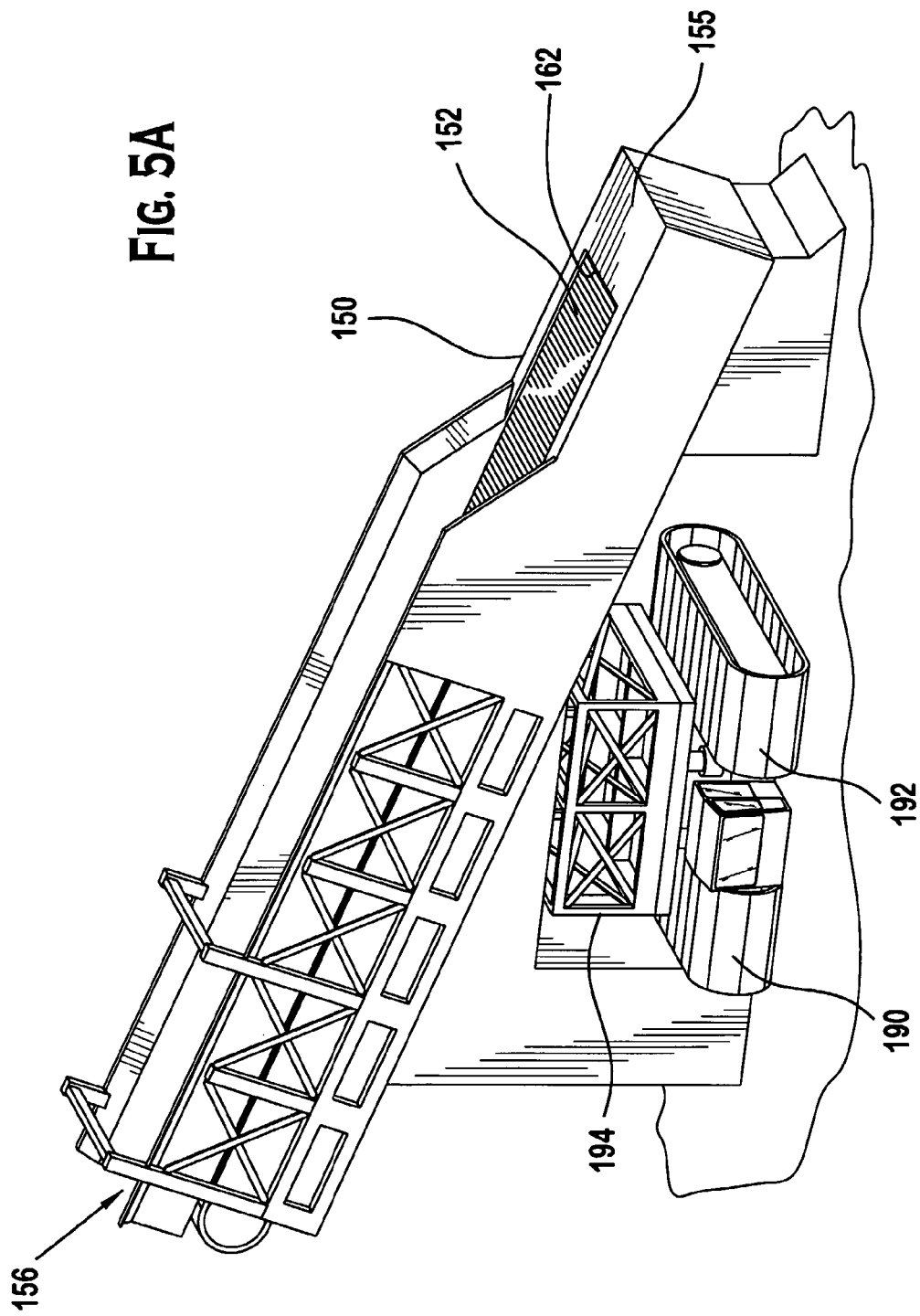
FIG. 5A is an illustration of a preferred apron feeder and transporter.
Figure 5B:
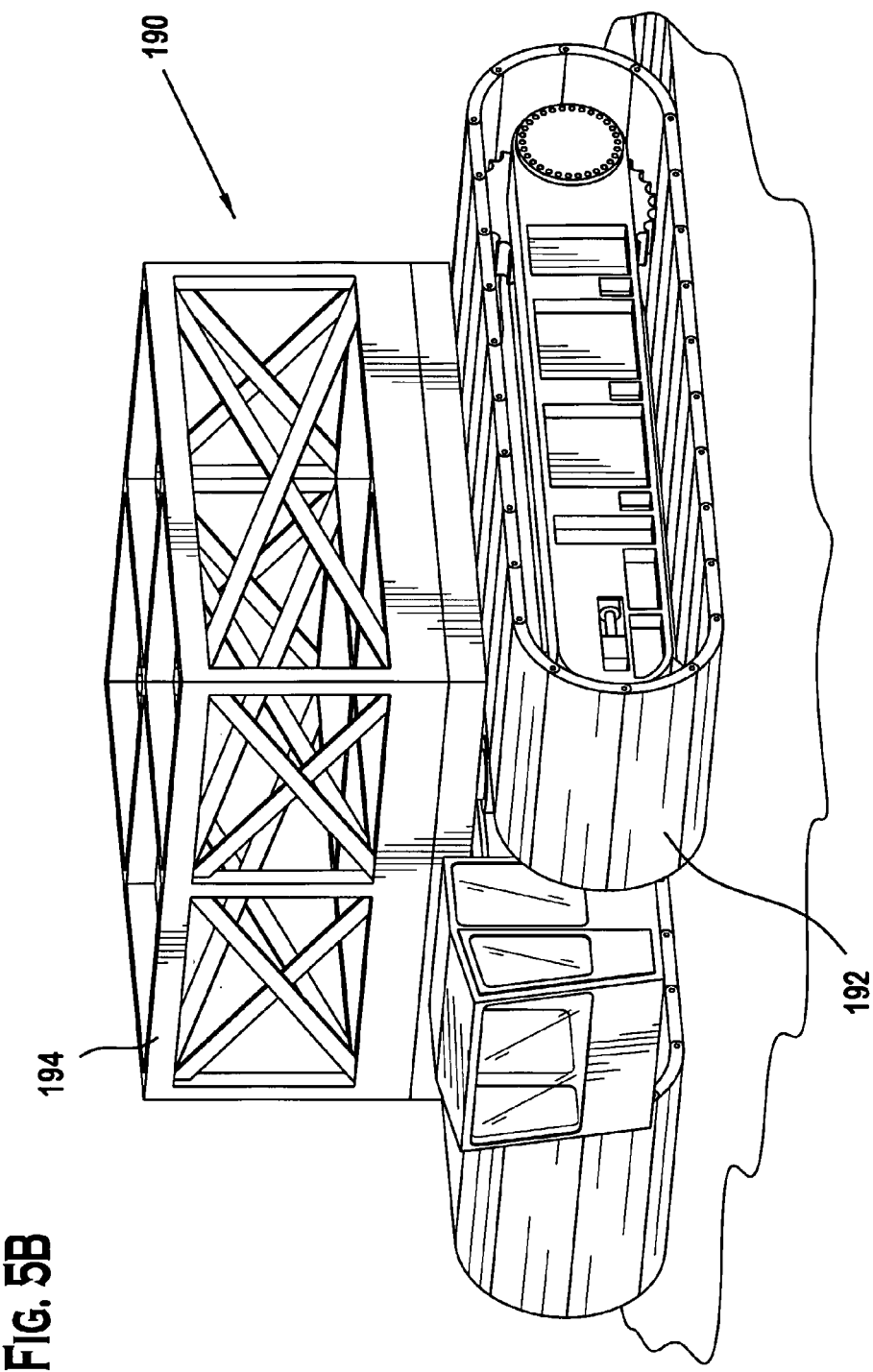
FIG. 5B is an illustration of a transport tractor.
Figure 5C:
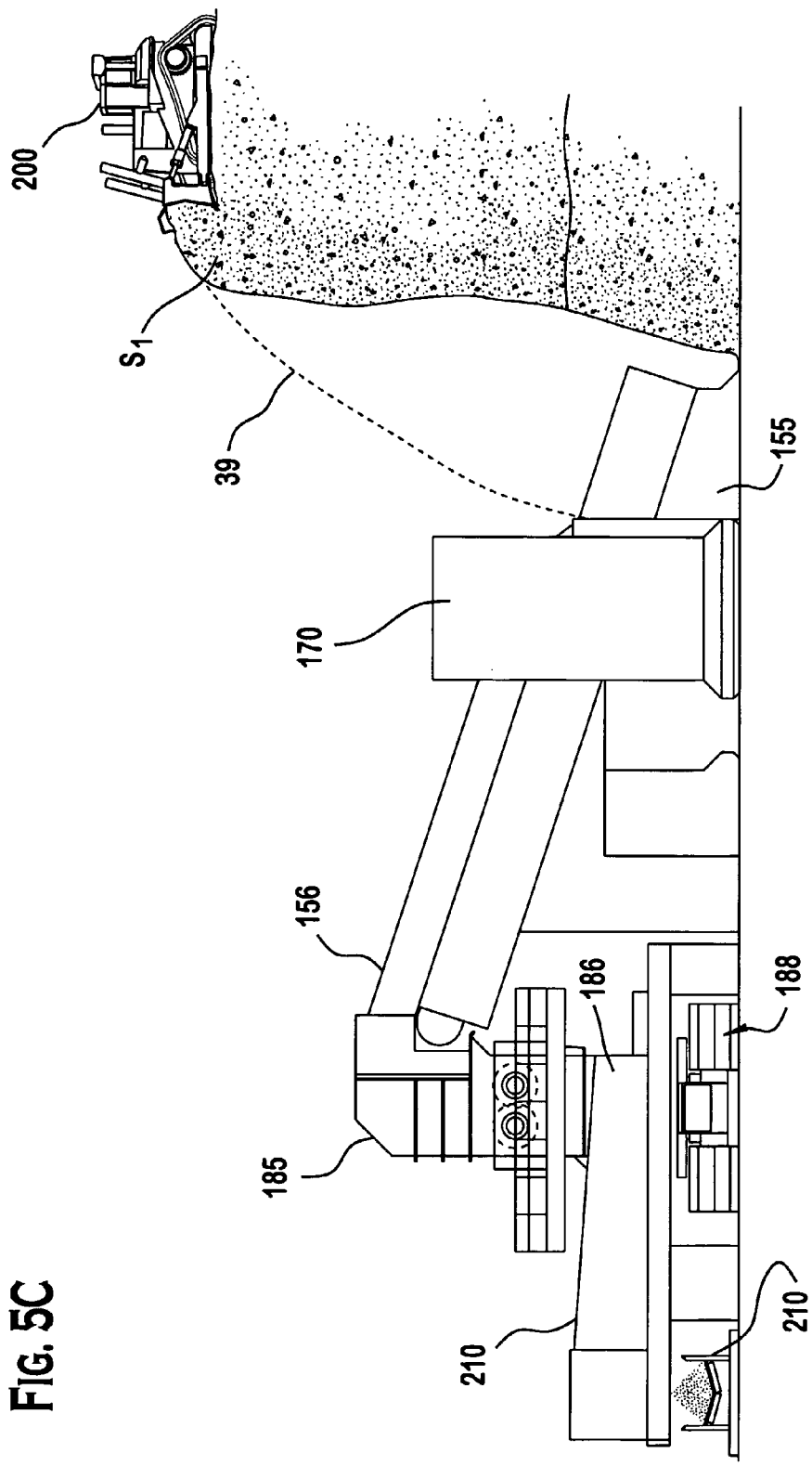
FIG. 5C is an illustration of a preferred apron feeder with extension walls and a sizer attached to the outlet end of the apron feeder.

The apron feeder 150 is mounted at a desired angle upon a selectively configured frame 154 such as shown in FIG. 4. The desired angle is preferably 14 to 15 degrees above horizontal. Preferably, the frame 154 supports the apron feeder so that its outlet end 156 is located at a height sufficient to fill a dump truck 180 positioned beneath the outlet end 156. Alternatively, as depicted in FIG. 5C, a sizer 185 can be attached to the outlet end 156 of the apron feeder 150 to reduce large size chunks of overburden to a manageable size for conveying by a conveyor system 210 which is then disposed beneath a conveyor loading apparatus 186 associated with the sizer 185.

Where a conveyor system is used, the conveyor system 210 then transports the overburden from the active mining site such as illustrated in FIG. 1B. As illustrated in FIG. 3A, the conveying system 210 can extend along a bench 22 so that the entire apron feeder 150 and sizer 185 combination can simply move transversely from in front of a section $S_1$ to a subsequent section $S_2$ for a highly efficient overburden removal process without any alteration to the conveying system. Other alternatives for transporting overburden material from the apron feeder may be used alone or in combination with the examples provided above.

The frame 154 preferably includes a selectively defined opening for access by a transport crawler 190 in a direction that is transverse to the conveying direction of the apron feeder 150. As best seen in FIGS. 5A, 5B, and 5E, the transport crawler 190 preferably has treads 192 or other motive means suitable for the strip mining environment and preferably includes a vertically displaceable support bed 194.

In lieu of having a separate crawler 190, the apron feeder assembly 150 can include a dedicated transport crawler attached thereto. In Either case, the crawler 190 may optionally have a relatively rotatable support bed 194 associated with the transport crawler 190 to enable the crawler treads 192 to be turned relative to the apron feeder 150 to be in either a transverse or an aligned orientation with respect to the conveying direction of the apron feeder 150. With such an option, the transport crawler 190 can move the apron feeder assembly 150 in a conventional manner as is done with the apron feeders shown in FIGS. 2A and 2B and also move the apron feeder assembly 150 in a transverse manner by changing the directional orientation of the crawler treads.

When the apron feeder assembly 150 is to be relocated on a bench, the transport crawler 190 preferably travels beneath the apron feeder assembly 150 in the space defined by the frame 154, lifts the apron feeder assembly 150 on the support bed 194 above the bench and transversely repositions the apron feeder assembly 150 along the bench to a new location where it is lowered onto the bench. Preferably the frame 154 is structured so that the transport crawler 190 engages the apron feeder 150 directly below the center of mass of the entire apron feeder assembly 150. As shown in FIG. 5C, where the apron feeder 150 is used in connection with the sizer 185, a similar crawler 188 is preferably provided to transversely relocate the sizer 185 and its associated conveyor loading apparatus 186.

Figure 2A:
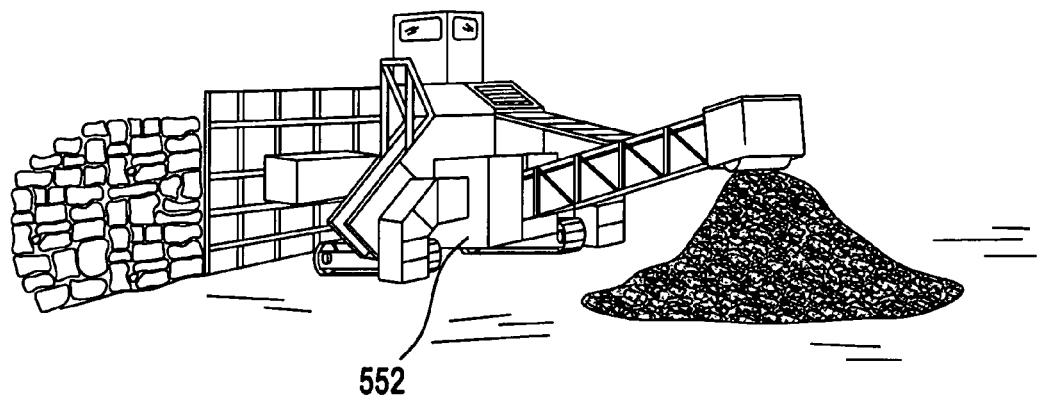
FIG. 2A illustrates the mobility of a conventional apron feeder in line with the feeder's conveying operation utilizing a crawler.
Figure 2B:
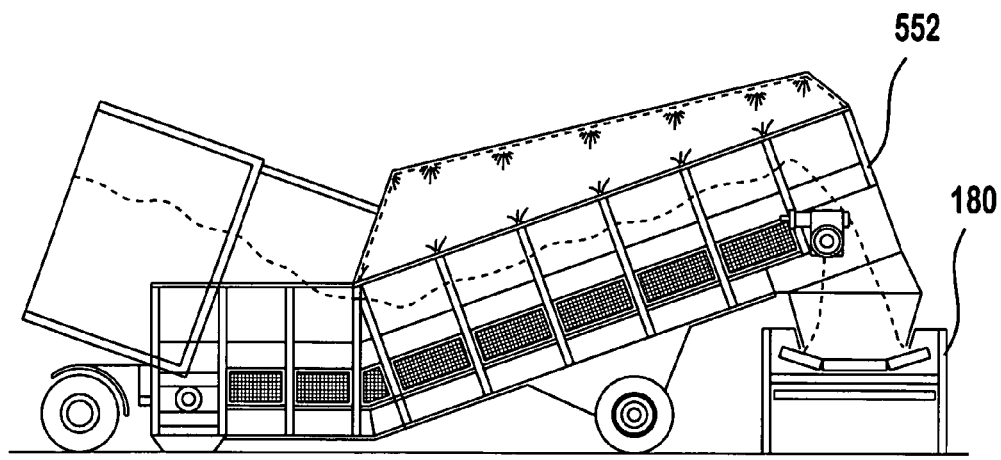
FIG. 2B illustrates the mobility of a conventional apron feeder in line with the feeder's conveying operation utilizing wheels.

As best seen in FIGS. 5C and 5D, the apron feeder assembly 150 is preferably used in connection with massive extension walls 170, 172 and a hydraulic assembly housing 174 having skids that permit them to be dragged by a bull dozer for placement at a desired location. Unlike conventional apron feeder walls which are semi-permanently erected such as illustrated in FIG. 2A, the walls 170, 172 are selectively designed with a large foot print and sufficient weight to remain immobile during the dozing operations used to feed the apron feeder, while remaining sufficiently mobile and easily transportable for quickly establishing a subsequent apron feeder operational site.

The hydraulic assembly housing 174 provides the motive power to the apron feeder and typically includes both hydraulic and electrical equipment for operation the apron feeder. The hydraulic assembly housing 174 may be designed with sufficient strength and bulk to serve as one of the extension walls. However, it is preferred to provide an extension wall disposed in between the dozing operations and hydraulic assembly housing 174.

As shown in FIG. 5D, preferably, a signal light 176 is provided which is controlled by the apron feeder operator having red and green lights. The signal light is advantageously used to signal to the operators of the bull dozers which load the apron feeder; a green light indicating when the feeder is ready to receive material and a red light indicating no loading should occur. Typically a red light indication will be given when there is a change of trucks at the outlet end.

For apron feeder operation, the walls 170,172 are positioned proximate the inlet end 152 of the apron feeder 150 and serve to protect the apron feeder operators and to assist in the formation of the natural hopper 40 formed during the dozing operations. The wall 170 also serves to protect the transport crawler 59 and to keep clear the area beneath the apron feeder frame 54 for the transport crawler to easily engage the apron feeder assembly 50 for transport.

Apron Feeder Self-Cleaning Mechanism

The dog box 155 provides protection to the front and sides of the feed end 152 of the apron feeder 150. However, during the dozing operation to load the feeder, some material spills into a gap 162 defined between the apron feeder's feed end 152 and the dog box 155. Although such spillage is a lesser problem when the apron feeder is loaded with dry material, material build up is exponentially increased where the apron feeder is loaded with wet sludge or slurry material. Typically the problem of such spillage build up results in periodic stoppage of apron feeder operation to remove built up spillage.

Figure 6A:
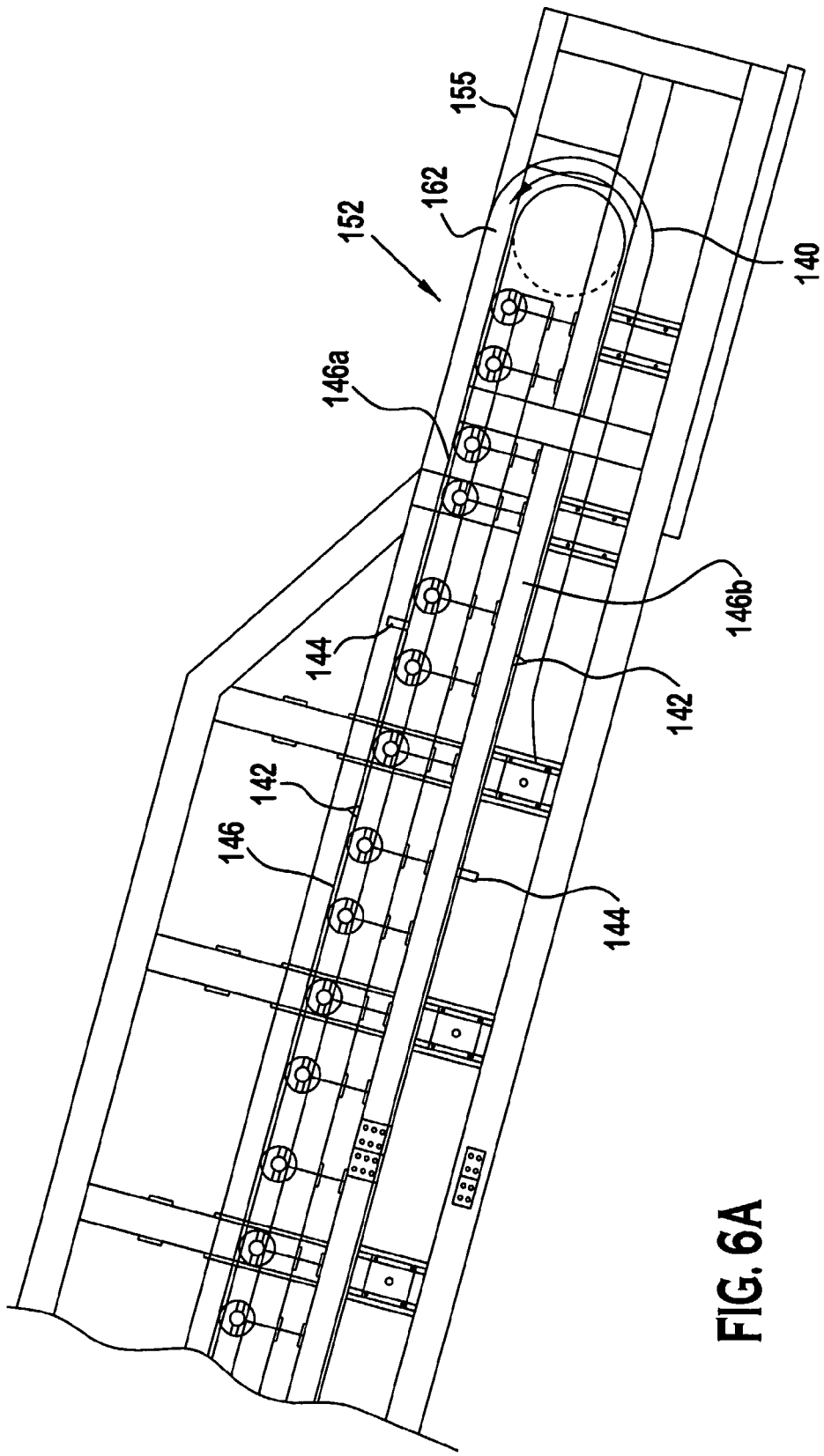
FIG. 6A is an elevated side view of the feed end of an apron feeder fitted with a scroll element.
Figure 6B:
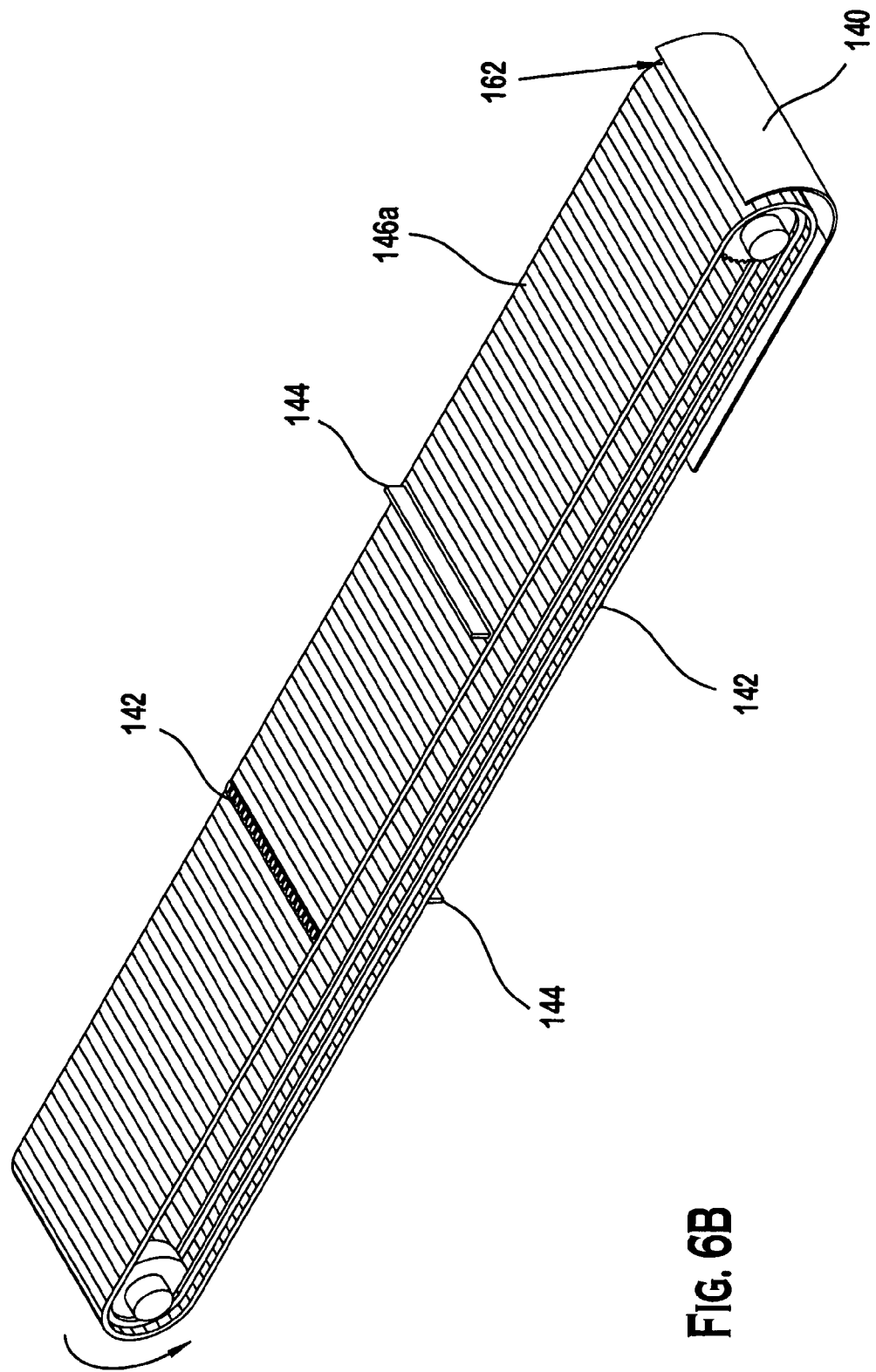
FIG. 6B is a perspective illustration of a self-cleaning mechanism of an apron feeder.
Figure 6C:
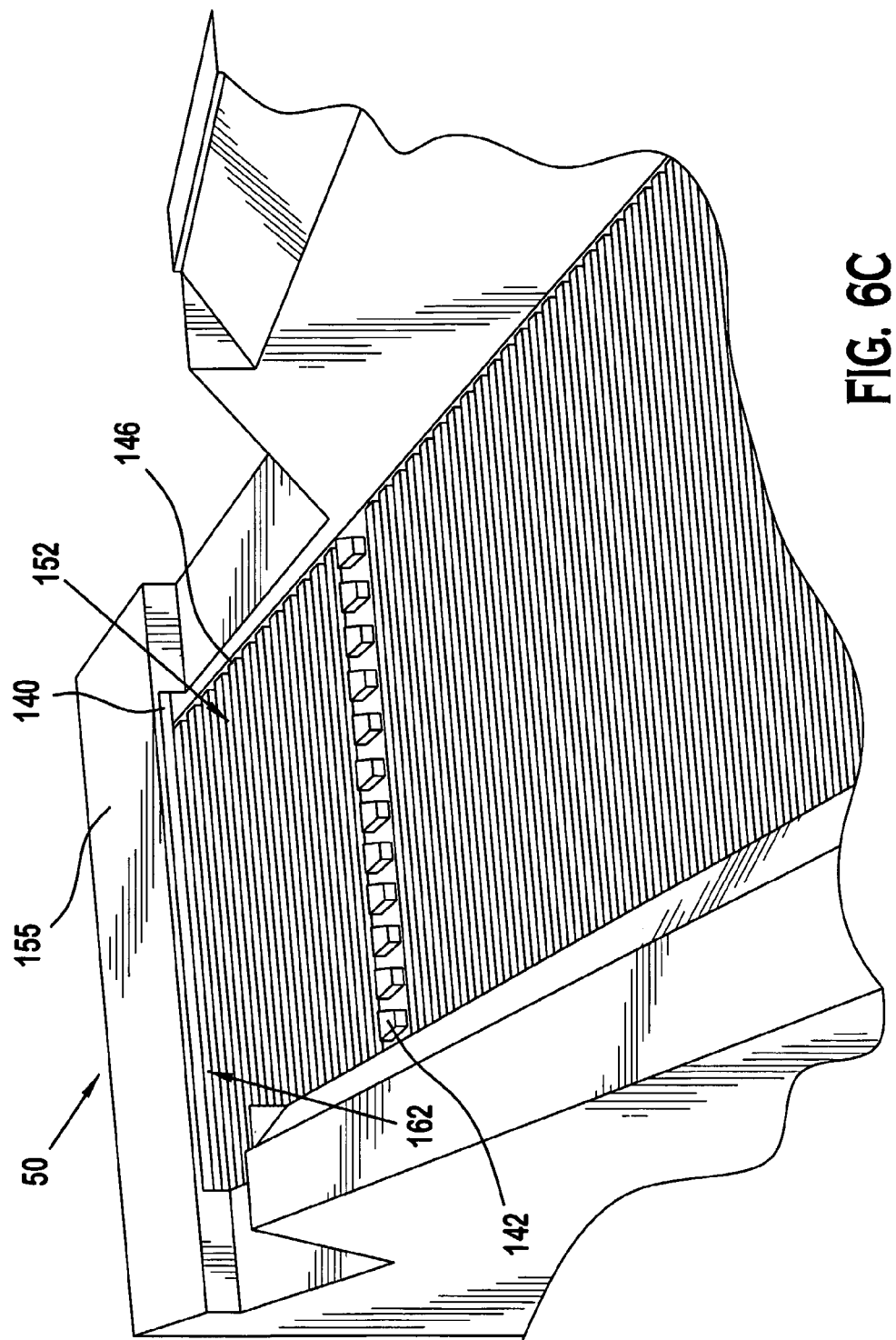
FIG. 6C is a perspective illustration of a top view of a preferred apron feeder.

As illustrated in FIGS. 6A-6C, in order to prevent or reduce the buildup of overspill material, the apron feeder 150 is provided with a self cleaning mechanism that includes a spillage catching scroll 140, a grizzly element 142, and a wiper element 144. The scroll element 140 comprises a strong metal sheet that is mounted to the dog box at the gap 162 and extends substantially parallel to the apron feeder fights 146 in front of the feed end of the feeder for a selected distance parallel the bottom surface 146b of the feeder 150. Preferably the scroll 140 is approximately 22 feet long.

The grizzly element 142 is mounted on one of the feeder flights 146 to define a row of metal teeth spanning transversely across the conveying surface. An associated wiper element 144 is mounted on one of the feeder flights 146 at a selected distance behind the grizzly 142 to define a raised blade spanning transversely across the conveying surface.

In operation, as the apron feeder is loaded, material that spills through the gap 162 is caught by scroll 140 where it collects. With each complete revolution to the apron feeder, the grizzly 142 travels along the scroll and breaks up the collected overspill material caught by the scroll. The wiper 144 then follows the grizzly 142 to push the broken up overspill back up onto the top surface 146a of the feeder 150. After the wiper 144 passes, the scroll 140 has been cleared to again begin to catch spillage into the gap 162.

More than one grizzly/wiper set can be provided so that the scroll is cleared multiple times during one complete revolution of the apron feeder. Preferably, two evenly spaced grizzly/wiper sets are provided, as illustrated in FIGS. 6A and 6B.

Dozer/Apron Feeder Overburden Removal

With reference to FIGS. 7A-7E and 8, details of a preferred dozer/apron feed overburden removal operation are illustrated. With the apron feeder 150 disposed on the bench 22 in front of the loosened section $S_1$ of overburden 29L, the dozers 200 perform an initial push to form a slope 34 and natural hopper 40. The dozers push an uppermost layer of overburden 29L1 towards the apron feeder 150 to form the slope 34 between the overburden section $S_1$ and the bench 22. The slope 34 angles downward to form overburden chute walls 39 on either side of the apron feeder 150. These chute walls 39 define a natural hopper or chute 40 sized and shaped to direct dozer-pushed overburden 29 to the inlet of the apron feeder 150.

Once the dozers 200 form the natural chute 40, the dozers 200 begin the task of removing the overburden 29L proceeds in removal of successive layers 29L2, 29L3, and 29L4 as illustrated in FIGS. 7C-E. Gravity provides assistance in this part of the operation since the angle of repose of the material being pushed in the natural hopper 40 is such that the material naturally slides down the slope 34 to the apron feeder 150. However, for the lower most overburden layer 29L4, the dozers 200 may need to push the overburden material upward to inlet of the apron feeder. This is somewhat dependent on the thickness of the underlying deposit.

FIGS. 9-14 illustrate several alternative methods for dozing the overburden 29L into the apron feeder 150. The general objective to maximize the efficiency of the dozers 200 which generally means to keep the dozers in constant motion. Accordingly, communication between the apron feeder, supervisors, dozer operators, and other personnel is desirable to achieve for maximum efficiency.

FIG. 9 shows a first embodiment for dozing loosened overburden 29L in a section $S_1$ into the apron feeder 150, in which several dozers 200 operate in discreet zones 50, 52, 54, 56, and 58. The dozers 200 in zones 50, 54, and 58 drive the overburden 29L to a staging area 59, where the dozers 200 operating in areas 52 and 56 take turns dozing the overburden 29L through the staging area 59 into the chute 40 to the apron feeder 150. The dozers 200 in zones 50, 54, and 58 preferably advance while the dozers in zones 52 and 56 retreat and vice versa to provide a system of continuous operation for all of the dozers.

FIG. 10 shows a second embodiment for dozing loosened overburden 29L in a section $S_1$ into the apron feeder 150, in which the dozers 200 in zones 52 and 56 doze the overburden 29 to the staging area 59 and dozers 200 in zones 50, 54 and 58 doze the overburden down the chute 40 to the apron feeder 150. Again, the dozers 200 in zones 50, 54, and 58 preferably advance while the dozers in zones 52 and 56 retreat and vice versa to provide a system of continuous operation for all of the dozers.

FIG. 11 shows a third embodiment for dozing loosened overburden 29L in a section $S_1$ into the apron feeder 150, in which the dozers 200 in zones 61 and 63 feed overburden 29L to dozers 200 in zones 60, 62, 64, and 66. The dozers 200 in zones 60, 62, 64, and 66 in turn feed overburden 29L into a slot 69. Another dozer 200 then dozes all of the overburden 29L in the slot 69 down the chute 40 to the apron feeder 150. The third embodiment's advantage is that it allows for more dozers 200 to work in concert with each other over a wider mining area 36. Further, because only the dozer 200 in the slot 69 feeds the apron feeder 150, there is little chance of a traffic jam at the slot 69.

FIGS. 12A-H illustrate iterative steps of a fourth embodiment for dozing loosened overburden 29L in a section $S_1$ to the apron feeder 150. This embodiment uses five dozers, one in each of four zones 70, 72, 74, and 76 and the fifth in a slot 75 to feed overburden 29L to the chute 40 and down to the apron feeder 150. The apron feeder 150 is illustrated loading dump trucks 180. Each truck 180 leaves the area once it is full of overburden 29L, and another takes its place.

Figure 12A:
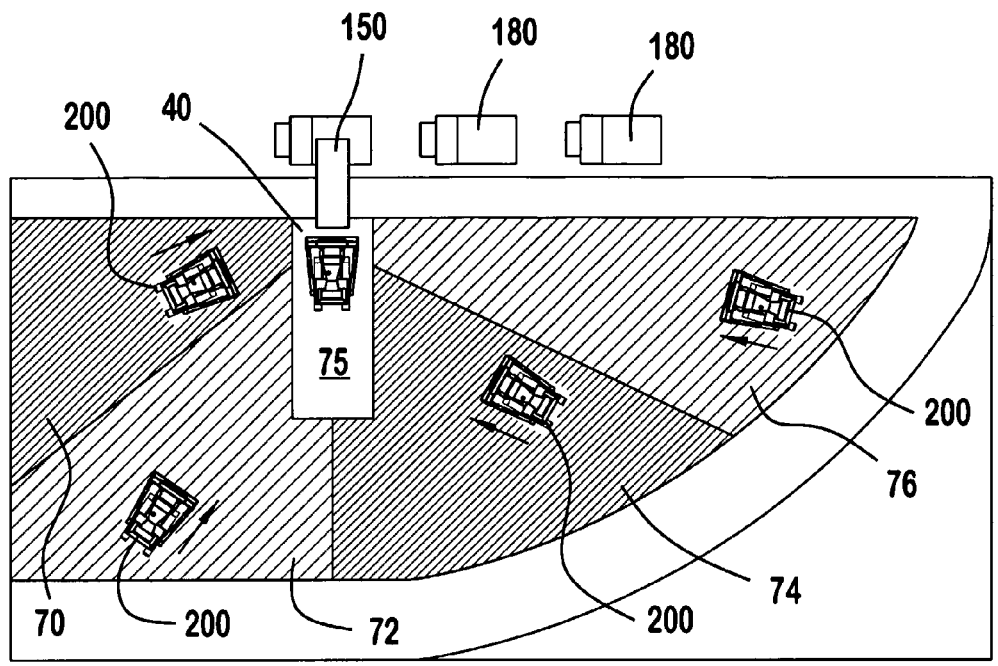
Figure 12B:
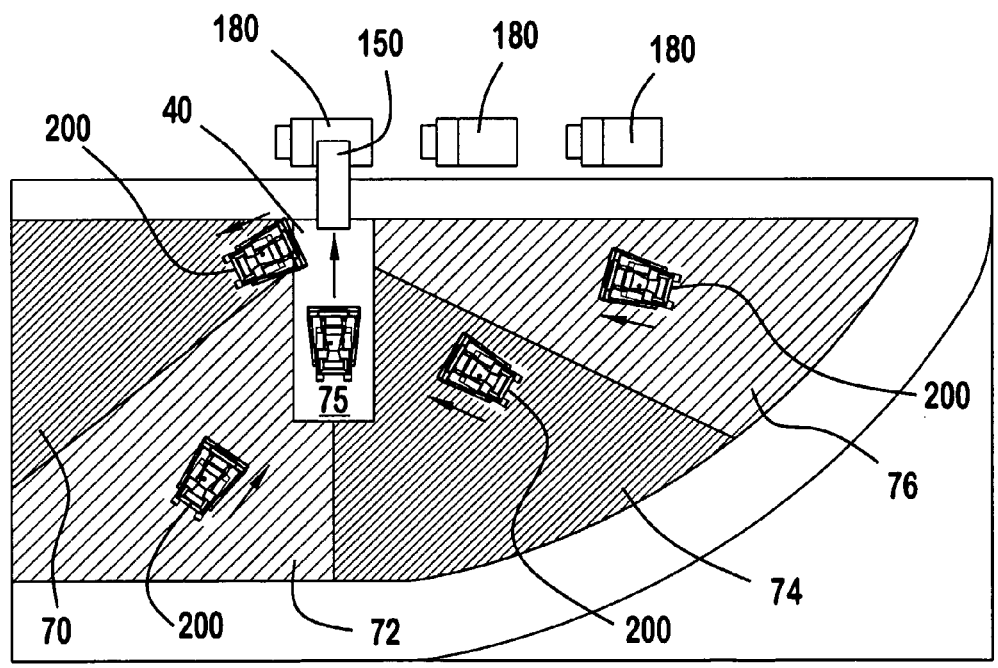
Figure 12C:
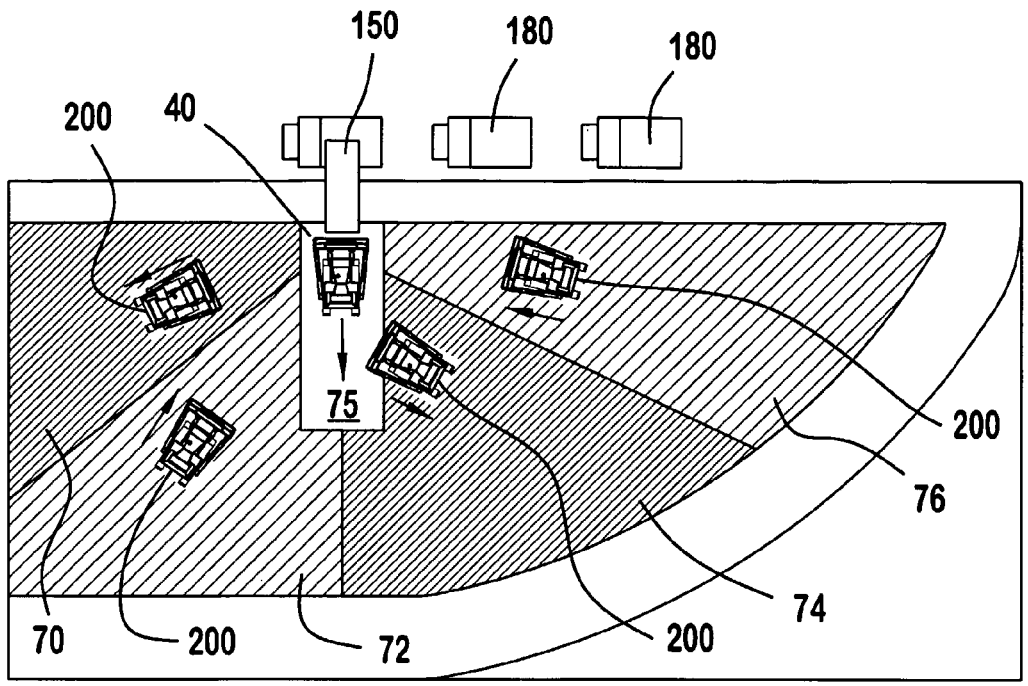

In the step shown in FIG. 12A, all dozers advance towards the slot 75, with the dozer 200 in zone 70 arriving in the slot 75 first, where it dumps its load of overburden. In the step in FIG. 12B, the dozer 200 in zone 70 begins its retreat through its zone 70 to gather another load, and the dozer 200 in the slot 75 prepares to drive a load to the hopper 40. The other dozers in the zones 72, 74, and 76 advance. In FIG. 12C, the dozer 200 in zone 74 has dumped its load of overburden and begins its run to pick up more overburden. The dozer 200 in zone 70 continues its run to pick up overburden, while the dozers in zones 72 and 76 advance.

Figure 12D:
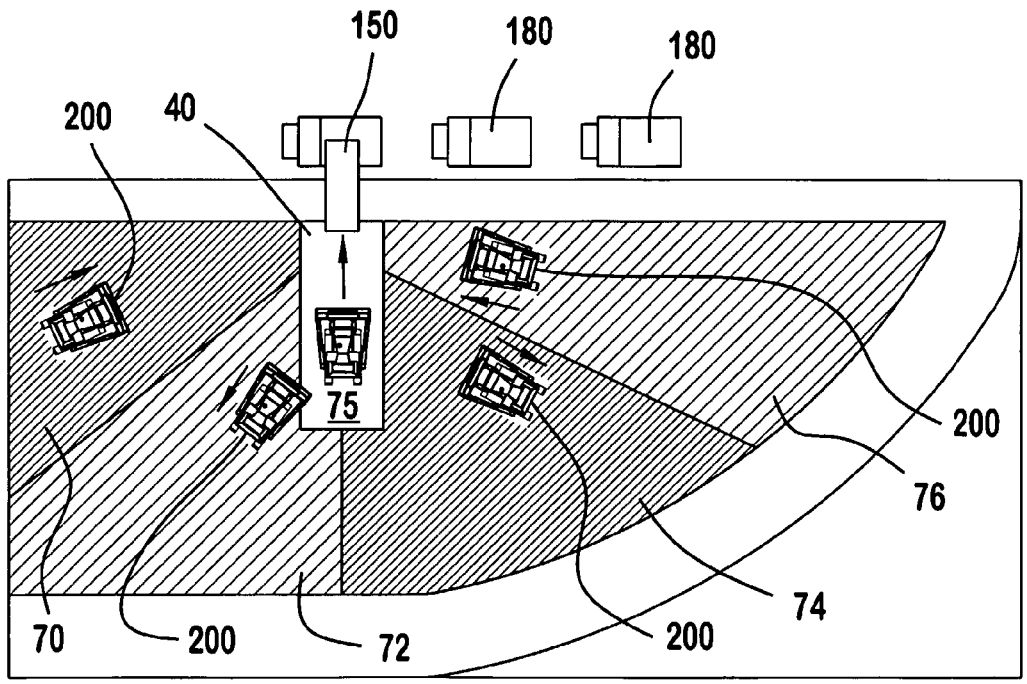
Figure 12E:
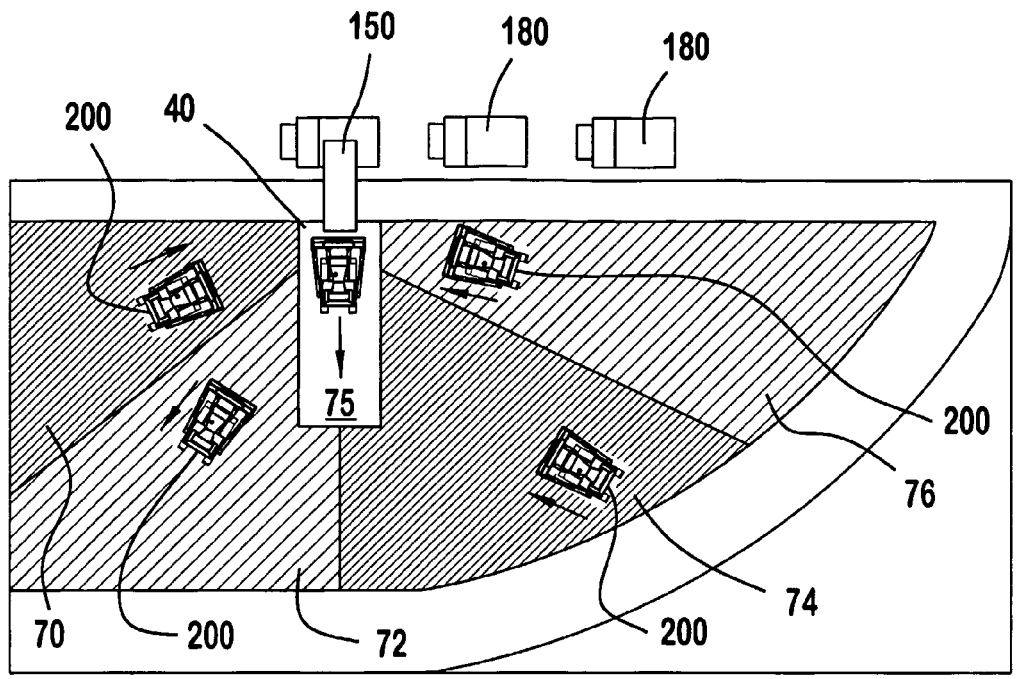
Figure 12F:
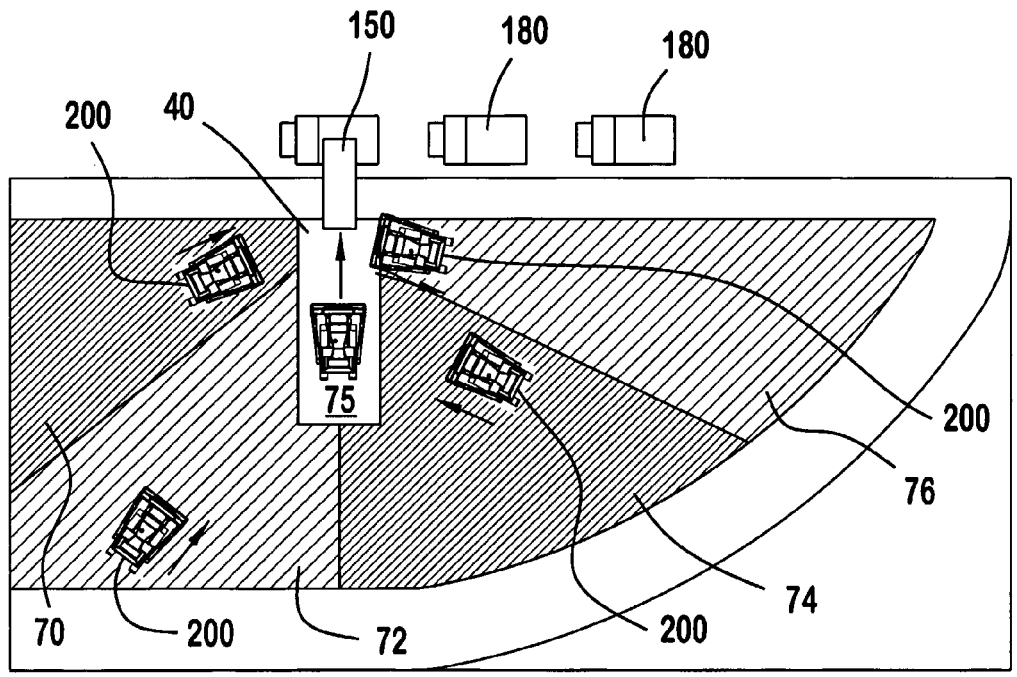

In FIG. 12D, the dozers in zones 70 and 76 advance and the dozers in zones 72 and 74 are still returning to pick up overburden. In FIG. 12E, the dozers in zones 70, 74, and 76 advance while the dozer 200 in zone 72, having dumped its load of overburden, returns to pick up more overburden. In FIG. 12F, the dozer 200 in zone 76 has dumped its overburden, and returns to pick up overburden, while the dozers in zones 70, 72, and 74 advance.

Figure 12G:
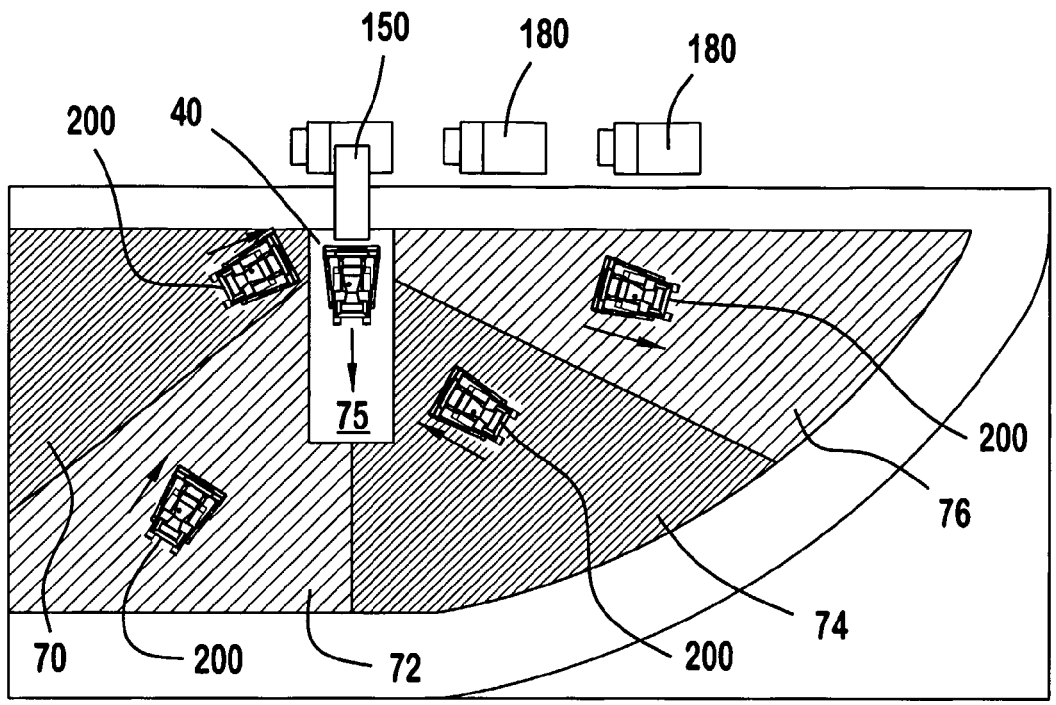
Figure 12H:
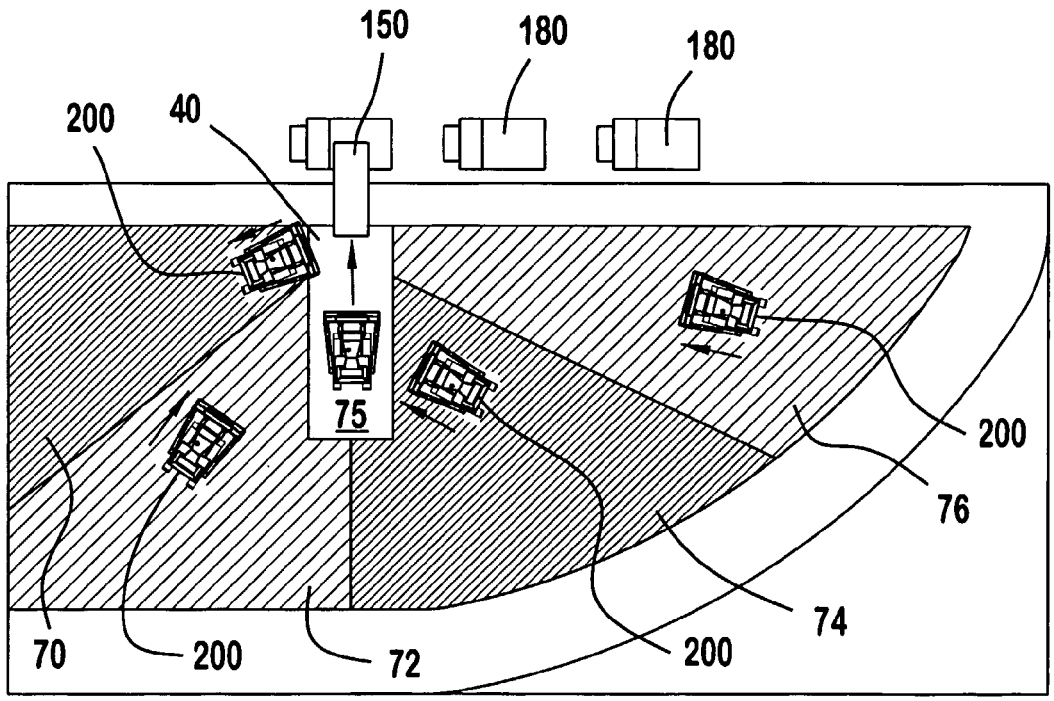

In FIG. 12G, the dozer 200 in zone 76 retreats, while the others advance. Finally, in FIG. 12H, the dozer 200 in zone 70 has dumped its load and returns for another, while the other dozers in zones 72, 74, and 76 advance. During these various advances through the zones, the dozer 200 in the slot 75 moves back and forth, driving the dumped loads into the natural hopper 40, with all dozers taking care not to interfere with one another and cause any work stoppage.

FIGS. 13A-H illustrate iterative steps of a fifth embodiment for dozing loosened overburden 29L in a section $S_1$ to the apron feeder 150. This embodiment uses four dozers, one in each of three zones 80, 82 and 84 and the fourth in a slot 85 to feed the natural hopper 40 leading to the apron feeder 150. The apron feeder 150 is illustrated loading dump trucks 180. Each truck 180 leaves the area once it is full of overburden 29L, and another takes its place.

Figure 13A:
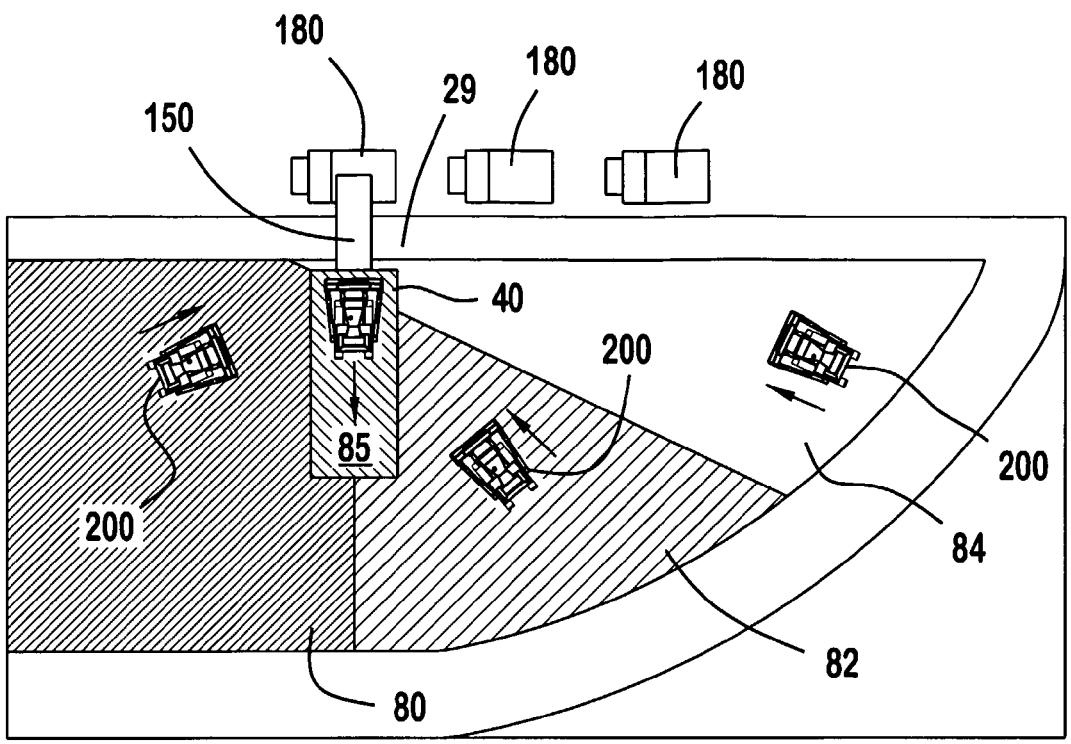
Figure 13B:
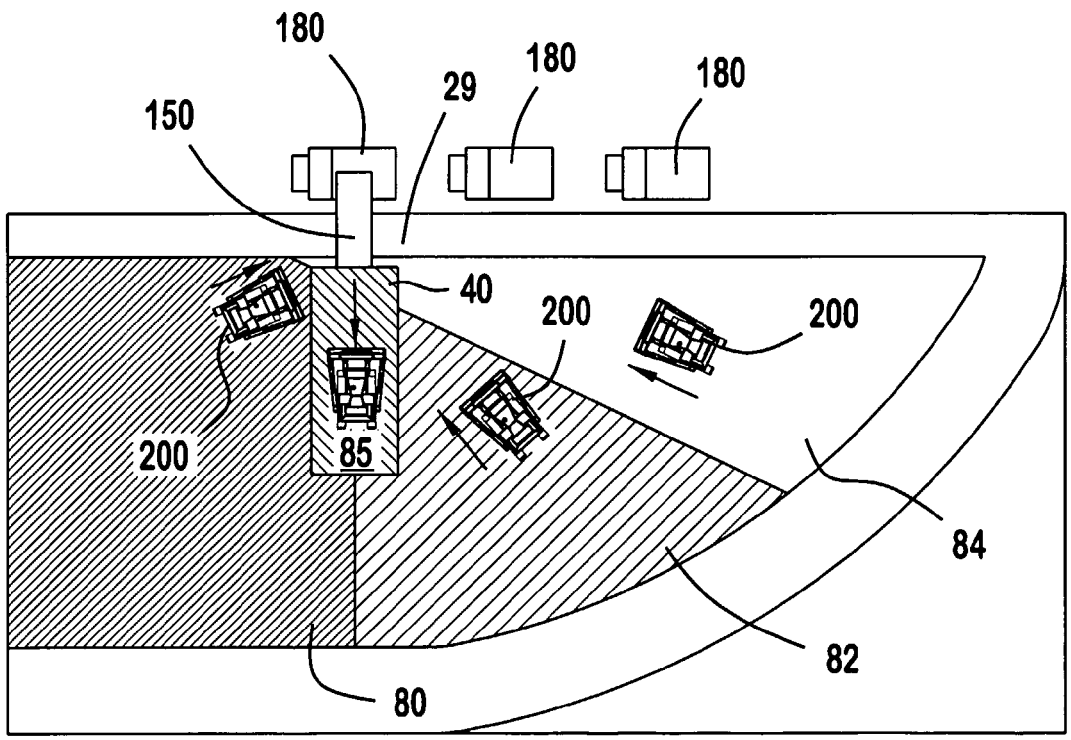
Figure 13C:
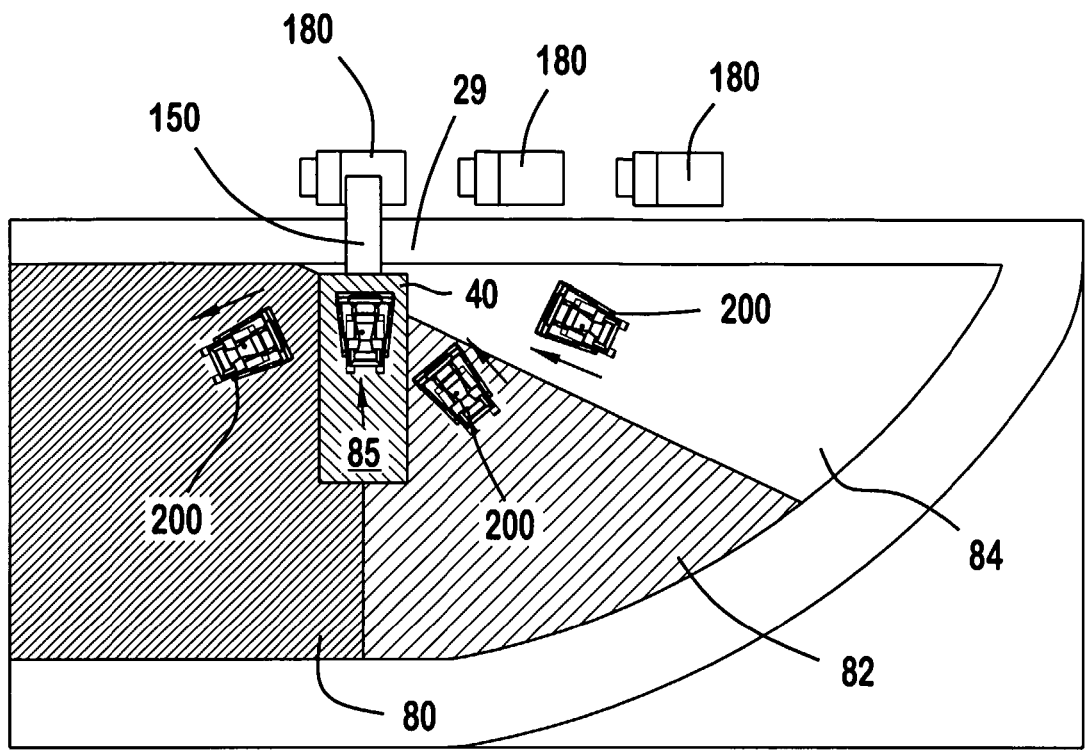
Figure 13D:
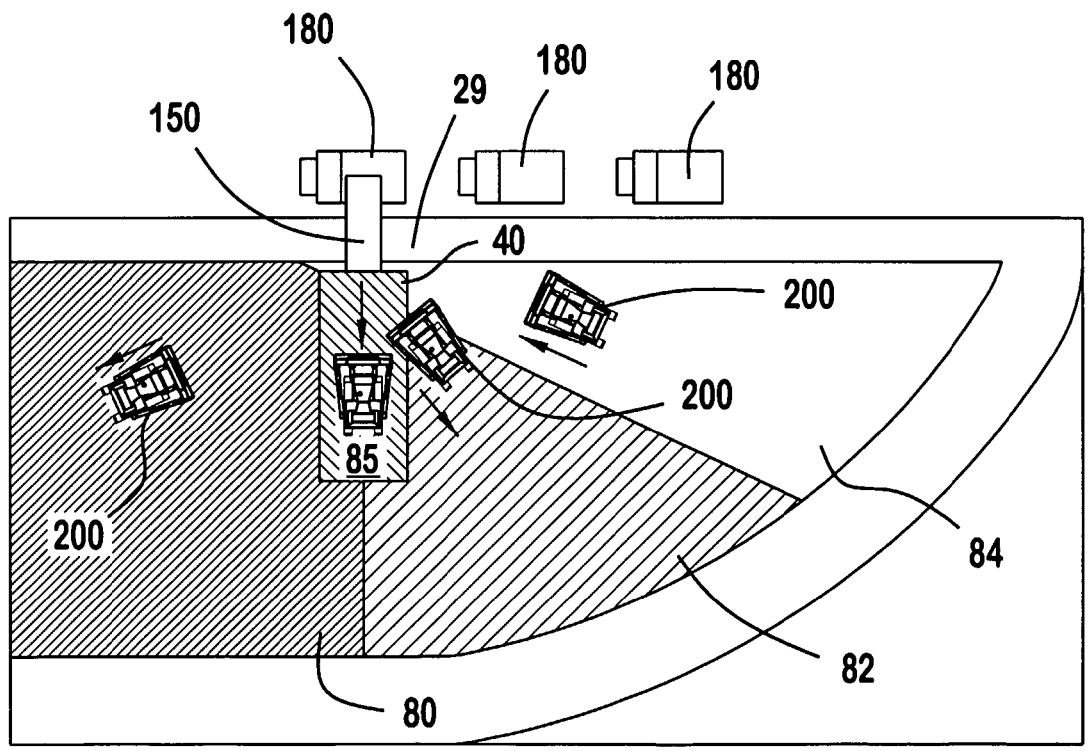

The consecutive steps of dozer movements are shown FIGS. 13A-H. FIG. 13A shows the dozers 200 in zones 80, 82, and 84 advancing to the slot 85, and FIG. 13B shows the same dozers further advanced towards the slot 85. In FIG. 13C, the dozer 200 in zone 80 has dumped its load of overburden and is beginning its return for another load, while the dozers in zones 82 and 84 advance towards the slot 85. In FIG. 13D, the dozer 200 in zone 82 begins its return for another load following the dumping of a load into the slot 85, while the dozer 200 in zone 80 continues its return run, and the dozer 200 in zone 84 advances.

Figure 13E:
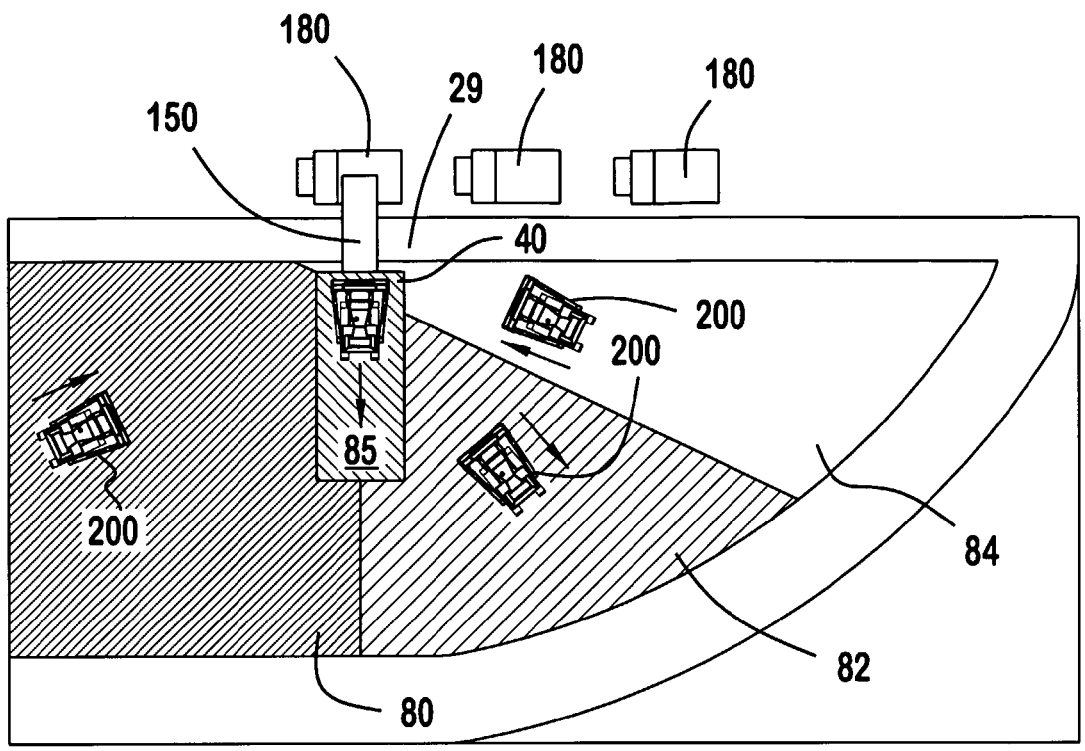
Figure 13F:
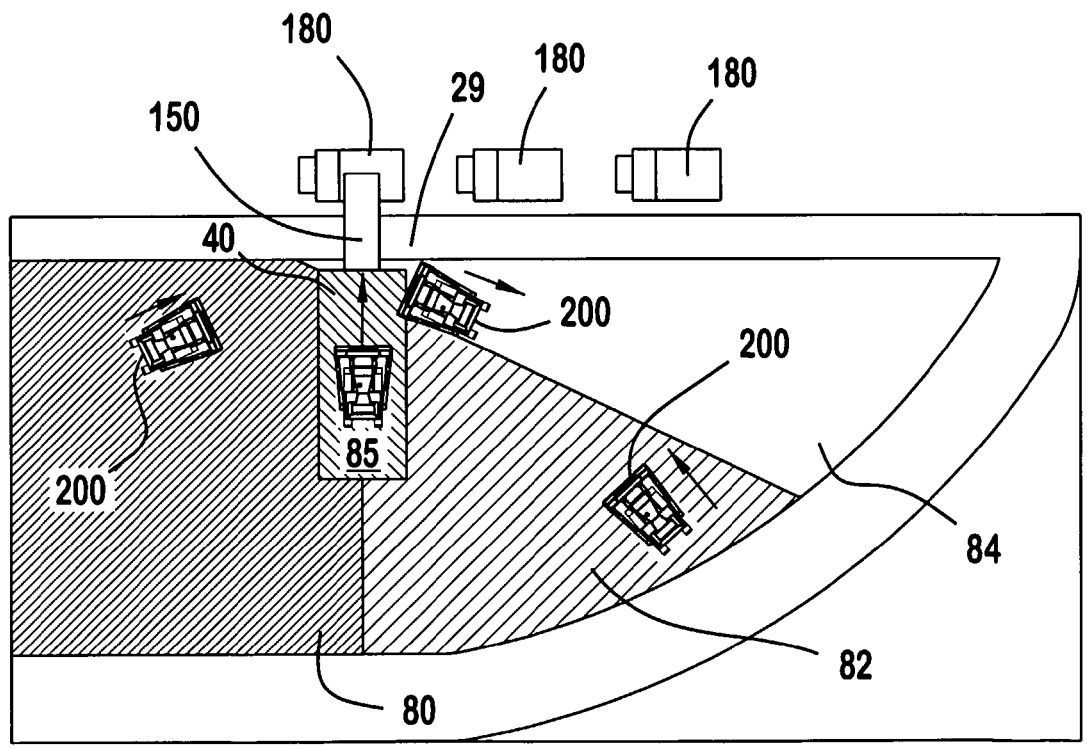
Figure 13G:
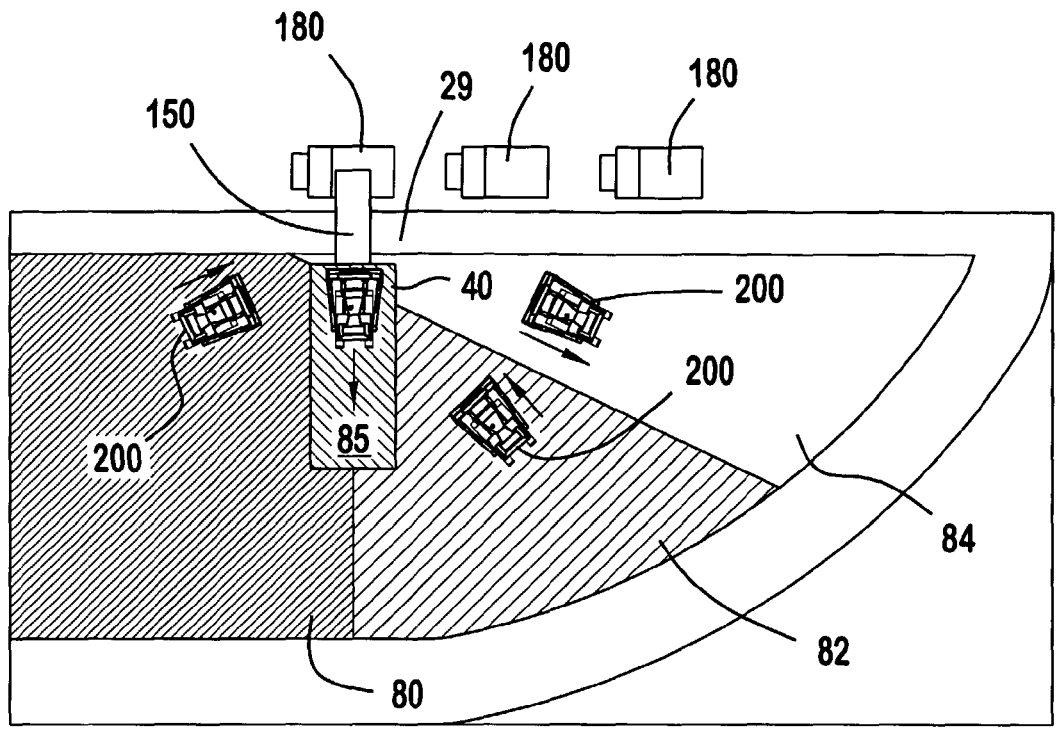
Figure 13H:
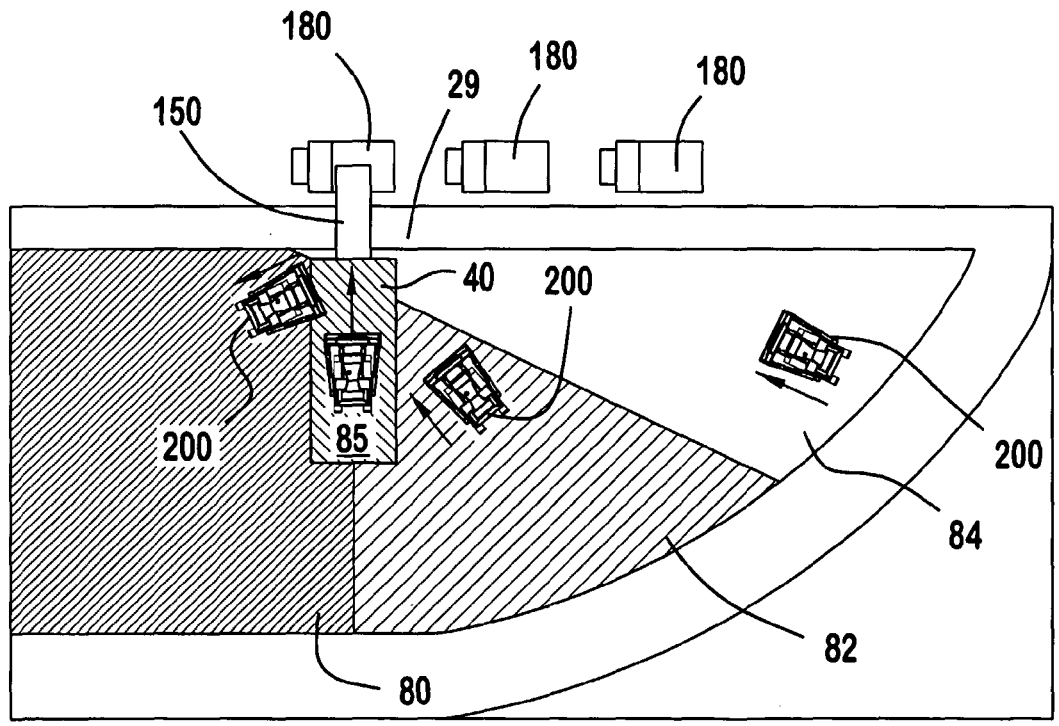

In FIG. 13E, the dozers in zones 80 and 84 advance, while the dozer 200 in zone 82 retreats for another load of overburden. In FIG. 13F, the dozers in zones 80, 82 advance, while the dozer 200 in zone 84 begins its return for another load, having just dumped its load in the slot 85, and FIG. 13G shows the further advance of the dozers following the step shown in FIG. 13F. Finally, FIG. 13H shows the dozers in zones 82 and 84 advance while the dozer 200 in zone 80 retreats to get another load of overburden, having just dumped its own load.

During these various advances through the zones, the dozer 200 in the slot 85 moves back and forth, driving the dumped loads into the natural hopper 40, with all dozers 200 taking care not to interfere with each other.

The various methods can be used in a single mining site. In addition, variants thereof may be used that employ more or less dozers 200. For example if one or more zones has a deeper cut of overburden 29 to remove, it may be advantageous to position more than one dozer in that zone, or split the zone into subzones. If too much overburden accumulates in a single dozer slot, and the dozer 200 therein falls behind, a staging area for two or more dozers may be more efficiently employed.

Apron Feeder Relocation

Once the dozers 200 remove the overburden from a section $S_1$, the apron feeder 150 is then moved to a new location, such as adjacent the next section of loosened overburden $S_2$. FIGS. 14A-I illustrate a preferred sequential procedure for moving the apron feeder 150 after the overburden removal operation is completed from section $S_1$.

Figure 14A:
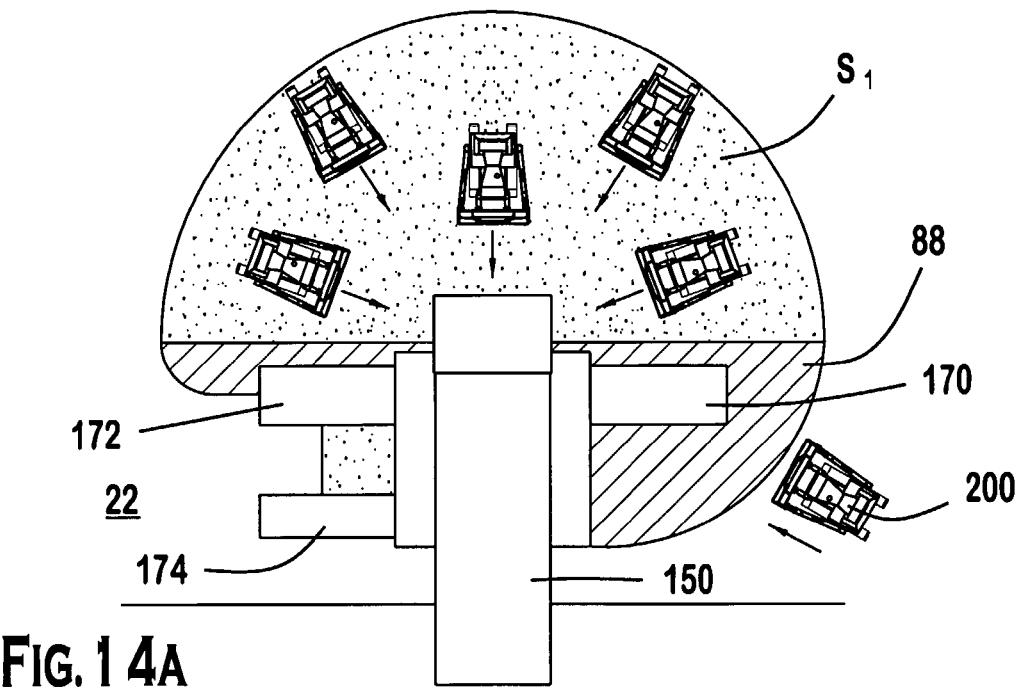
Figure 14B:
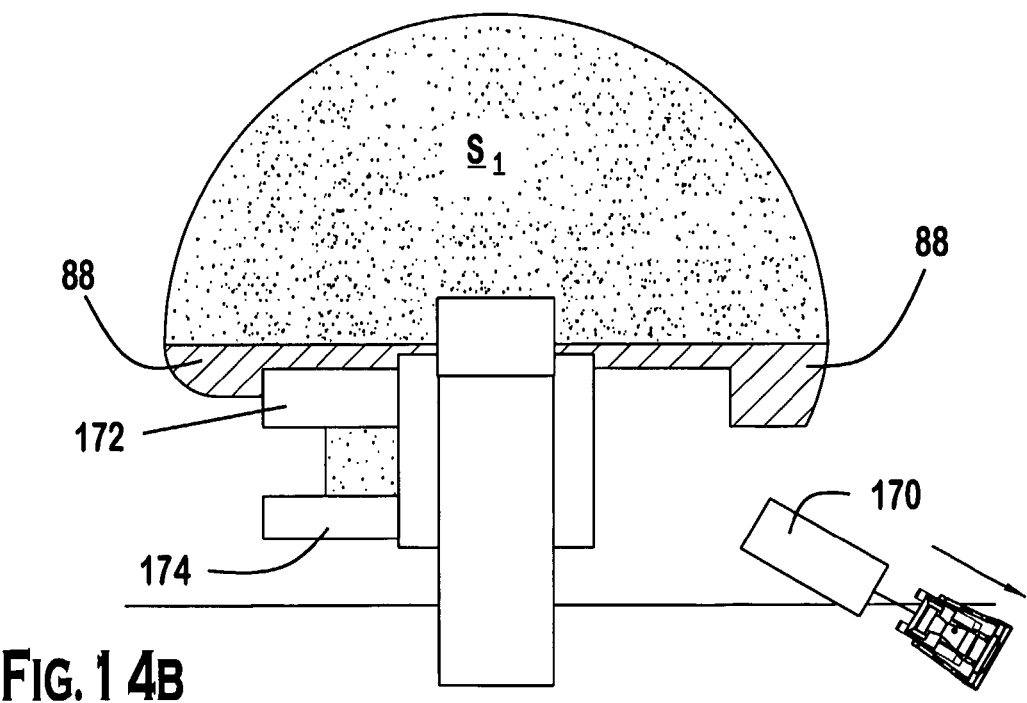
Figure 14C:
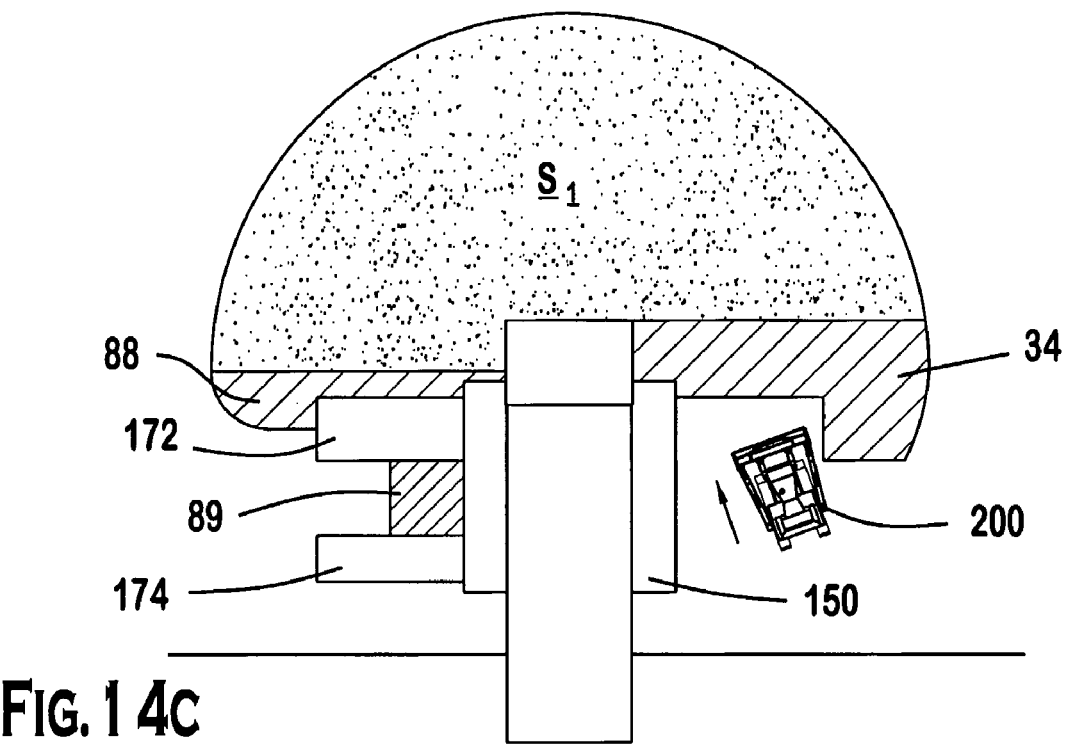

As the dozers 200 are completing the dozing of the lowest layer of the overburden 29L of a section $S_1$ into the apron feeder 150 (FIG. 14A), a single dozer 200 or other equipment cleans out overburden spillage on the right hand side of the apron feeder until it is clear as shown in FIG. 14B.

Once the right hand side of the apron 150 is clear, a dozer 200 or other equipment removes the right hand wall 170 of the apron feeder 150. With the right hand wall 170 removed, a dozer 200 or other equipment removes further overburden spillage, FIG. 14C, to completely clear right hand side of the apron feeder.

Figure 14D:
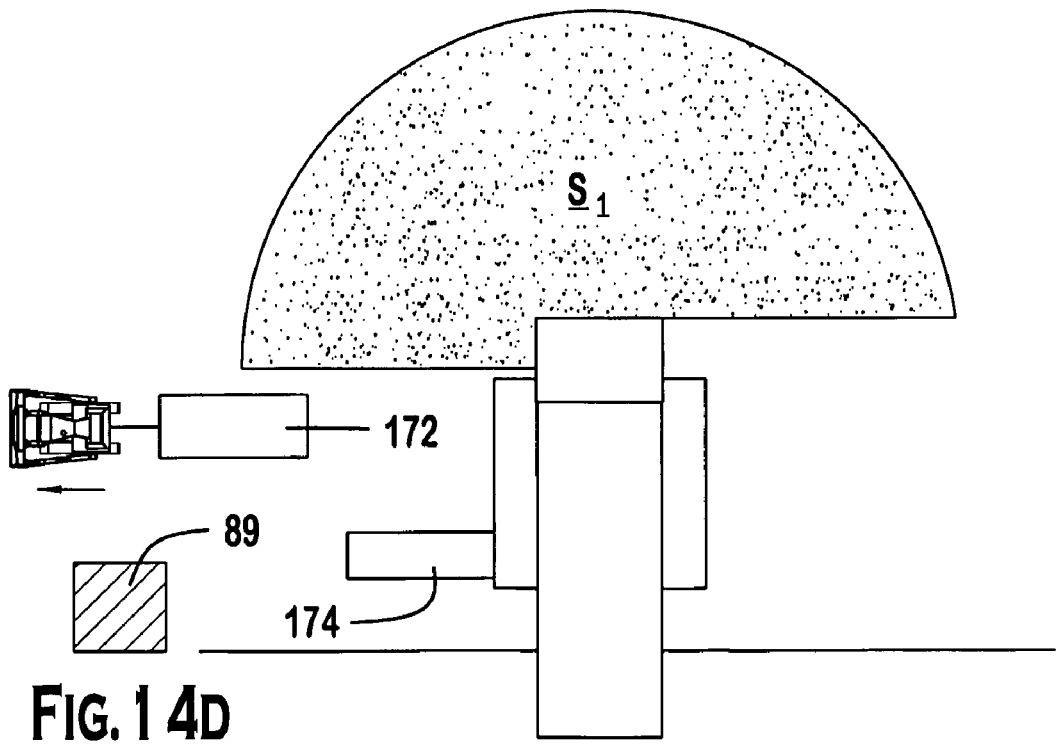
Figure 14E:
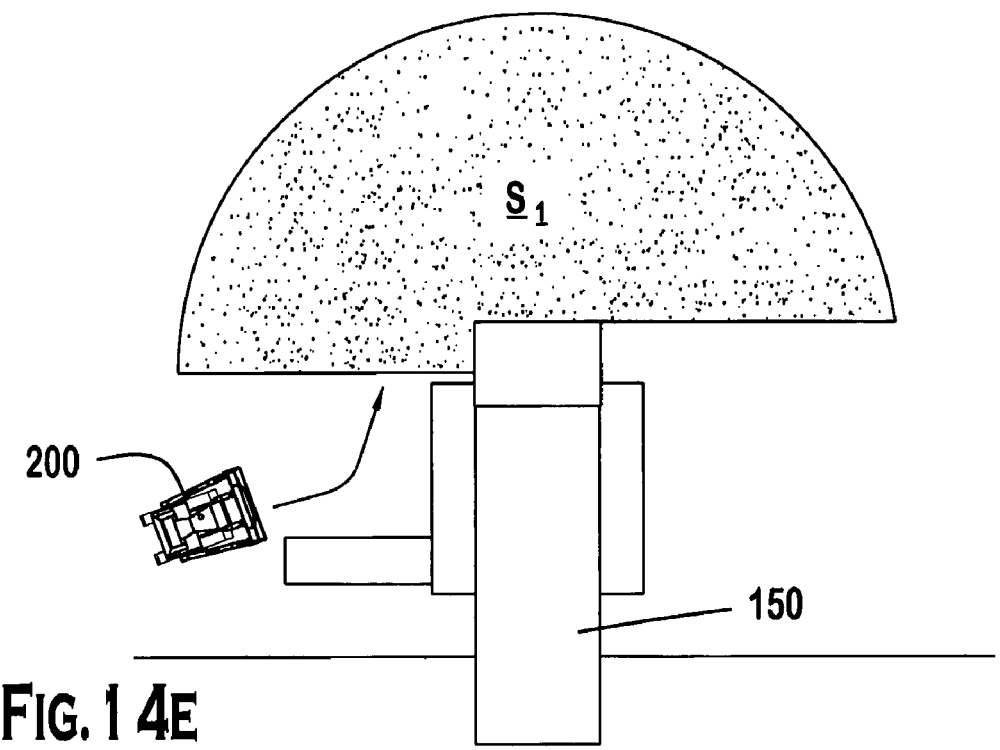
Figure 14F:
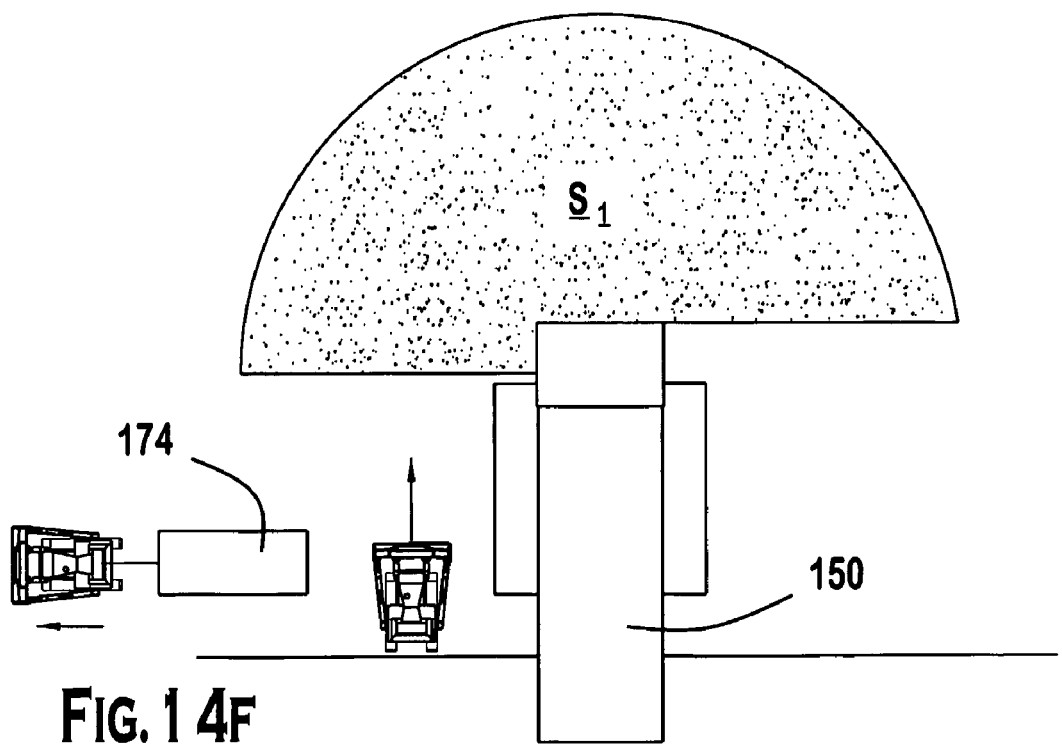
Figure 14G:
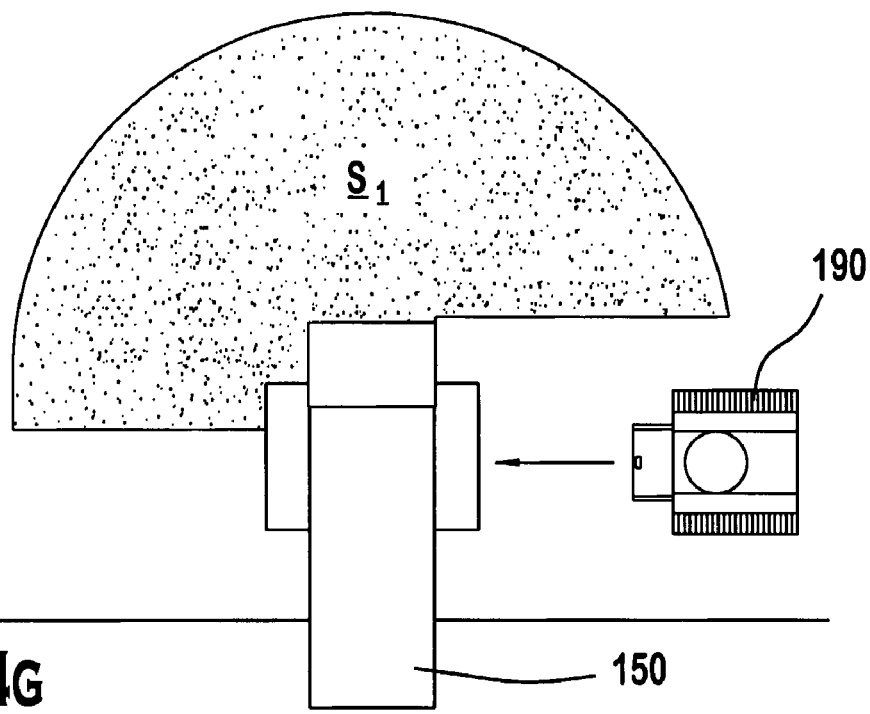
Figure 14H:
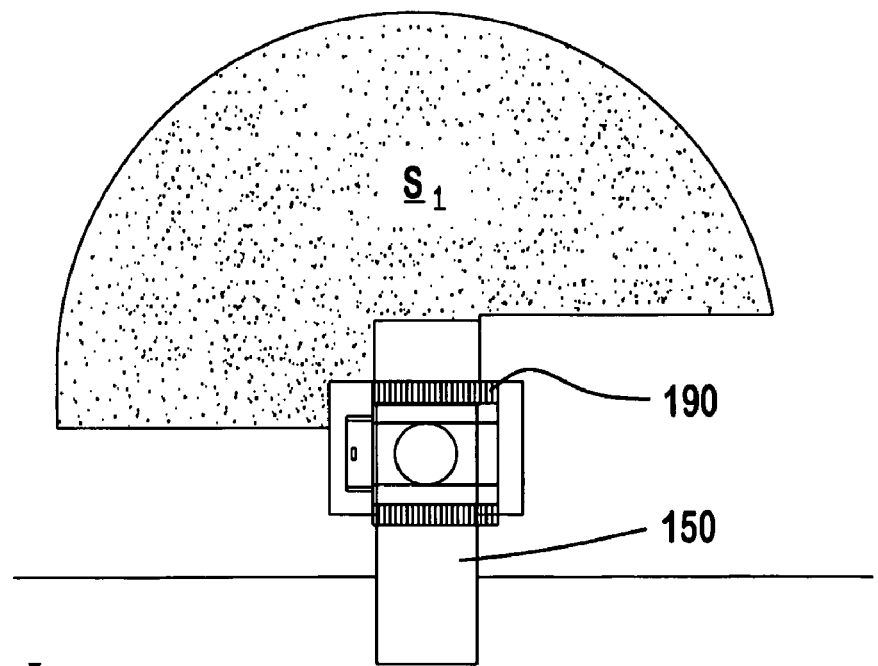
Figure 141:
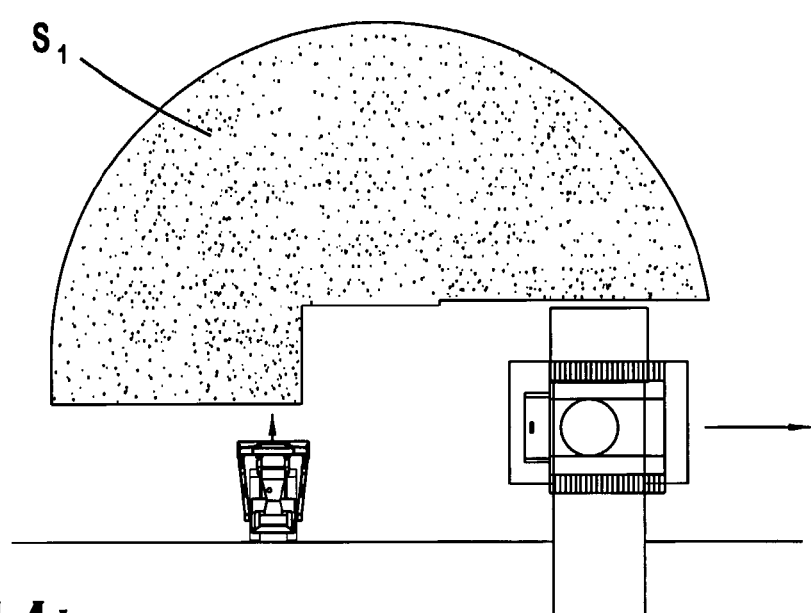

A dozer 200 then cleans away any overburden spillage about the left hand wall 172 and removes the wall 172 as shown in FIG. 14D. Any remaining overburden spillage 89 adjacent the hydraulic housing 174 on the left side is then also removed as shown in FIG. 14E. Thereafter, the hydraulic housing 174 is disconnected from the apron feeder 150, and a dozer 200 removes the housing 174 for final cleaning on the left hand side, as shown in FIG. 14F. Finally, as shown in sequential steps 14G-I a transporter 190 moves in from the right of the apron feeder, lifts it and carries the apron feeder 150 to its new location, such as adjacent another section $S_2$ of loosened overburden whereat the hydraulic housing 174 and walls 170, 172 are reattached.

While specific embodiments of the invention are disclosed they are not limiting in nature. Those of ordinary skill in the art will recognize a variety of variations in parameters, equipment and processes which can be employed within the scope of the invention.

What is claimed is:

1. An apron feeder comprising:
a plurality of transport flights configured for travel in a continuous elongated loop having top and bottom sides and configured to convey materials on the top side from a feed end to an outlet end of the apron feeder;
a scroll element mounted at the feed end of the apron feeder configured to catch material spilling off in front of the feed end, said scroll element having an elongated flat portion extending beneath a portion of the bottom side of the loop of transport flights in a substantially parallel orientation;
a wiper element mounted on a transport flight configured to clean material caught by the scroll element as the wiper element moves from the bottom side to the top side of the loop with the flight to which the wiper element is mounted; and
a grizzly element mounted on a transport flight to break apart material caught on the scroll element before the wiper element cleans the material from the scroll element.

2. The apron feeder of claim 1, wherein:
the grizzly element comprises a row of metal teeth spanning transversely across the flight on which the grizzly element is mounted; and
the wiper element comprises a raised blade spanning transversely across the flight on which the wiper element is mounted.

3. The apron feeder of claim 1, wherein a plurality of grizzly and wiper element sets are provided evenly spaced along loop of flights.

4. The apron feeder of claim 1 wherein:
the feed end and the outlet end define a conveying direction;
the apron feeder is mounted on a frame at a desired fixed angular orientation with the feed end at a lower load position and the outlet end at a raised position; and
the frame has an open area thereunder to receive a transport unit to transport the apron feeder in its fixed angular orientation in a direction transverse to the conveying direction of the apron feeder when the transport unit is positioned beneath the center of gravity of the apron feeder assembly.

5. The apron feeder of claim 4 further comprising a transport unit that includes a vertically displaceable member for lifting the apron feeder in advance of transporting it.

6. The apron feeder assembly of claim 5 wherein the transport unit is attached to the apron feeder frame.

7. The apron feeder assembly of claim 5 wherein the transport unit includes motive means for imparting movement in the transverse direction and a rotation assembly for reorienting the motive means with respect to the apron feeder to enable the apron feeder to be transported in a direction aligned with the conveying direction.

8. The apron feeder assembly according to claim 5 wherein the transport unit includes treads for imparting movement in the transverse direction.

* * * * *